(12) United States Patent
Palermo et al.

(10) Patent No.: US 12,120,595 B2
(45) Date of Patent: Oct. 15, 2024

(54) SATELLITE 5G TERRESTRIAL AND NON-TERRESTRIAL NETWORK INTERFERENCE EXCLUSION ZONES

(71) Applicant: Intel Corporation, Santa Clara, CA (US)

(72) Inventors: Stephen T. Palermo, Chandler, AZ (US); Chetan Hiremath, Portland, OR (US); Rajesh Gadiyar, Chandler, AZ (US); Jason K. Smith, Santa Clara, CA (US); Valerie J. Parker, Portland, OR (US); Udayan Mukherjee, Portland, OR (US); Neelam Chandwani, Portland, OR (US); Francesc Guim Bernat, Barcelona (ES); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 17/598,165

(22) PCT Filed: Mar. 26, 2021

(86) PCT No.: PCT/US2021/024456
§ 371 (c)(1),
(2) Date: Sep. 24, 2021

(87) PCT Pub. No.: WO2021/221842
PCT Pub. Date: Nov. 4, 2021

(65) Prior Publication Data
US 2023/0109635 A1     Apr. 6, 2023

Related U.S. Application Data

(60) Provisional application No. 63/124,520, filed on Dec. 11, 2020, provisional application No. 63/104,344, (Continued)

(51) Int. Cl.
*H04W 48/02* (2009.01)
*H04B 7/185* (2006.01)
(Continued)

(52) U.S. Cl.
CPC ........ *H04W 48/02* (2013.01); *H04B 7/18519* (2013.01); *H04B 7/18521* (2013.01);
(Continued)

(58) Field of Classification Search
CPC ..... H04W 48/02; H04W 16/28; H04W 84/06; H04B 7/18519; H04B 7/18513; H04B 7/18521; H04B 7/195
See application file for complete search history.

(56) References Cited

U.S. PATENT DOCUMENTS 5,785,279 A * 7/1998 Gregory ............... B64G 1/1021
244/158.4
5,809,418 A * 9/1998 Tayloe ............... H04B 7/18556
455/430
(Continued)

FOREIGN PATENT DOCUMENTS

CN         106209207        8/2018
KR       20130073624 A      7/2013
(Continued)

OTHER PUBLICATIONS

Yano et al. Satellite communication system utlilizing un-stationary satellite, 2001, pp. 1-10 (Year: 2001).*
(Continued)

*Primary Examiner* — Keith Ferguson
(74) *Attorney, Agent, or Firm* — Schwegman Lundberg & Woessner, P.A.

(57) ABSTRACT

Various approaches for the deployment and use of communication exclusion zones, defined for use with a satellite non-terrestrial network (including within a low-earth orbit
(Continued)

satellite constellation), are discussed. In an example, defining and implementing a non-terrestrial communication exclusion zone includes: calculating based on a future orbital position of a low-earth orbit satellite vehicle, an exclusion condition for communications from the satellite vehicle; identifying, based on the exclusion condition and the future orbital position, a timing for implementing the exclusion condition for the communications from the satellite vehicle; and generating exclusion zone data for use by the satellite vehicle, the exclusion zone data indicating the timing for implementing the exclusion condition for the communications from the satellite vehicle.

29 Claims, 24 Drawing Sheets

Related U.S. Application Data filed on Oct. 22, 2020, provisional application No. 63/065,302, filed on Aug. 13, 2020, provisional application No. 63/018,844, filed on May 1, 2020.

(51) Int. Cl.
  *H04B 7/195* (2006.01)
  *H04W 16/28* (2009.01)
  *H04W 84/06* (2009.01)

(52) U.S. Cl.
  CPC ............ *H04B 7/195* (2013.01); *H04W 16/28* (2013.01); *H04W 84/06* (2013.01)

(56) References Cited

U.S. PATENT DOCUMENTS

| | | |
|---|---|---|
| 8,099,186 B2 | 1/2012 | Tekawy et al. |
| 2001/0045494 A1 | 11/2001 | Higgins |
| 2013/0272272 A1 | 10/2013 | Kedem et al. |
| 2015/0003253 A1 | 1/2015 | Wolfner et al. |
| 2016/0149599 A1 | 5/2016 | Lindsay et al. |
| 2016/0183139 A1 | 6/2016 | Meredith et al. |
| 2016/0277095 A1 | 9/2016 | Marsh et al. |
| 2018/0176656 A1 | 6/2018 | Baudoin et al. |
| 2019/0068742 A1 | 2/2019 | Harrington et al. |
| 2019/0109633 A1 | 4/2019 | Williams et al. |
| 2020/0007227 A1 | 1/2020 | Becker et al. |
| 2020/0059294 A1 | 2/2020 | Qin et al. |
| 2020/0344847 A1 | 10/2020 | Nardini et al. |

FOREIGN PATENT DOCUMENTS

| | | | |
|---|---|---|---|
| WO | WO-2017175696 A1 * | 10/2017 | ............... B64G 1/10 |
| WO | WO-2018052527 A2 | 3/2018 | |
| WO | 2019118381 | 6/2019 | |
| WO | 2020051508 | 3/2020 | |
| WO | 2021221736 | 11/2021 | |
| WO | 2021221842 | 11/2021 | |

OTHER PUBLICATIONS

"End-to-End Delay, Throughput, and Performance Analysis of Satellite-UMTS Telecommunication Networks", Proceeding of the IEEE 28thCanadian Conference on Electrical and Computer EngineeringHalifax, Canada, May 3-6, 2015, (May 2015), 5 pgs.
"International Application Serial No. PCT US2020 067007, Invitation to Pay Additional Fees mailed Nov. 23, 2021", 7 pgs.
"International Application Serial No. PCT US2020 067007, International Search Report mailed Jan. 4, 2022", 5 pgs.
"International Application Serial No. PCT US2020 067007, Written Opinion mailed Jan. 4, 2022", 7 pgs.
Oltjon, Kodheli, "Satellite Communications in the New Space Era: A Survey and Future Challenges", arXiv:2002.0881 1vl, https: arxiv.org abs 2002.08811vl, (Feb. 2020), 5-36.
"International Application Serial No. PCT/US2021/024456, International Search Report mailed Jul. 21, 2021", 3 pgs.
"International Application Serial No. PCT/US2021/024456, Written Opinion mailed Jul. 21, 2021", 4 pgs.
Volk, Florian, et al., "Satellite Integration into 5G: Accent on First Over-The-Air Tests of an Edge Node Concept with Integrated Satellite Backhaul", Future Internet MDPI, (Sep. 5, 2019), 17 pgs.
"European Application Serial No. 21795987.3, Extended European Search Report mailed May 10, 2024", 12 pgs.
Xu, Pin, "Uplink Interference Analysis between LEO and GEO Systems in Ka Band", IEEE 4th International Conference on Computer and Communications (ICCC), IEEE 789-794, (Dec. 7, 2018), 6 pgs.

* cited by examiner

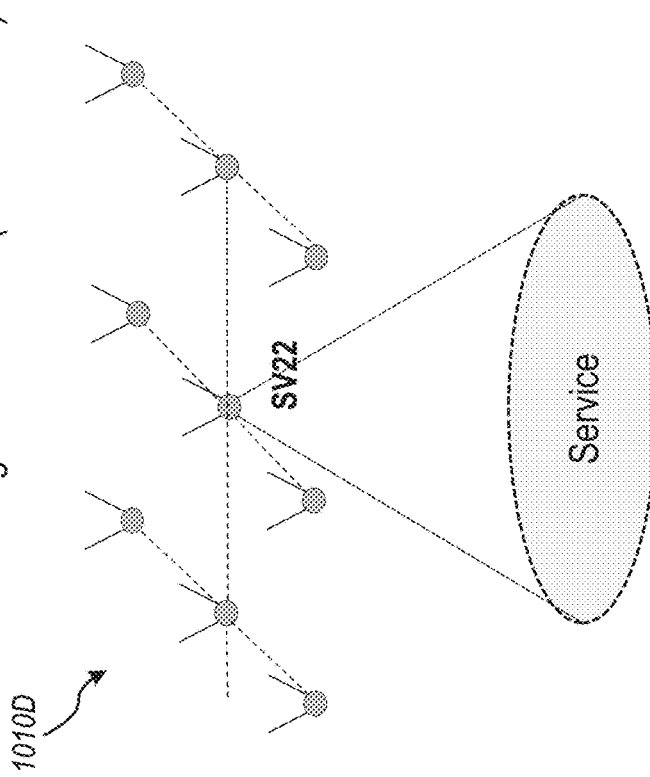
FIG. 10C
FIG. 10D

| SVn.ID.NAME | SPOTn.TOGGLE | ISL.DIRECTION | SVn.SHADE |
|---|---|---|---|
| SV1 | | | |
| SV2 | | | |
| SV3 | (Frequency/ Spot Beam Enable) (FIG. 12A, FIG. 12B) | (ISL Link Enable) (FIG. 12C) | (Reflection Mitigation) (FIG. 12D) |
| SV4 | | | |
| SV5 | | | |
| SV6 | | | |
| SV7 | | | |
| SV8 | | | |
| ... | | | |
| SV25 | | | |

SET EZ (OUTPUT PER CONSTELLATION)

DISABLE DIFFERENT FREQUENCY IN DIFFERENT SPOTBEAMS

| SVn.ID.NAME | SVn.SPOTn.TOGGLE | SVn.SPOT1.TOGGLE | SVn.SPOTn.FREQn.TOGGLE | | | |
|---|---|---|---|---|---|---|
| | | | SVn.SPOT1.FREQ1 | SVn.SPOT1.FREQ2 | SVn.SPOT1.FREQ3 | |
| SV1 | ENABLE | ENABLE | ENABLE | ENABLE | ENABLE | |
| SV2 | ENABLE | ENABLE | ENABLE | ENABLE | ENABLE | |
| SV3 | ENABLE | ENABLE | ENABLE | ENABLE | ENABLE | |
| SV4 | ENABLE | ENABLE | ENABLE | ENABLE | ENABLE | |
| SV5 | ENABLE | ENABLE | ENABLE | ENABLE | ENABLE | |
| SV6 | ENABLE | ENABLE | ENABLE | ENABLE | ENABLE | |
| SV7 | ENABLE | ENABLE | ENABLE | VALUE1 | ENABLE | |
| SV8 | ENABLE | ENABLE | ENABLE | ENABLE | ENABLE | |
| SV9 | ENABLE | ENABLE | ENABLE | ENABLE | ENABLE | |
| ... | | | | | | |

1110A

VALUE 1:
SV7.SPOT1.FREQ2.DISABLE
START 2021-03-03 21:43:56;
STOP 2021-03-03 21:45:06;

SET E2 (OUTPUT PER CONSTELLATION)

1110B — DISABLE ALL FREQUENCIES OF SPOTBEAMS

| SVn.ID.NAME | | SVn.SPOT2.TOGGLE | | | | |
|---|---|---|---|---|---|---|
| | | | SVn.SPOTn.FREQn.TOGGLE | | | |
| | | | SVn.SPOT2.FREQ1 | SVn.SPOT2.FREQ2 | SVn.SPOT2.FREQ3 | |
| SV1 | | | ENABLE | ENABLE | ENABLE | |
| SV2 | | | ENABLE | ENABLE | ENABLE | |
| SV3 | | | ENABLE | ENABLE | ENABLE | |
| SV4 | | | ENABLE | ENABLE | ENABLE | |
| ... | | | ... | ... | ... | |
| SV12 | | | ENABLE | ENABLE | ENABLE | |
| SV13 | | | VALUE2 | VALUE2 | VALUE2 | |
| SV14 | | | ENABLE | ENABLE | ENABLE | |
| SV15 | | | ENABLE | ENABLE | ENABLE | |
| ... | | | ... | ... | ... | |

1120B — VALUE 2:
SV13.SPOT2.DISABLE
START 2021-05-04 22:43:56;
STOP 2021-05-04 22:46:06;

*FIG. 12B*

SET EZ (OUTPUT PER CONSTELLATION)

1110C  DISABLE INTER-SATELLITE LINKS PER DIRECTION

| SVn.ID.NAME | SVn.ISL.FORE | SVn.ISL.AFT | SVn.ISL.RIGHT | SVn.ISL.LEFT |
|---|---|---|---|---|
| SV1 | ENABLE | ENABLE | ENABLE | ENABLE |
| ... | ... | ... | ... | ... |
| SV15 | ENABLE | ENABLE | ENABLE | ENABLE |
| SV16 | ENABLE | VALUE5 | ENABLE | ENABLE |
| SV17 | ENABLE | ENABLE | VALUE6 | ENABLE |
| SV18 | ENABLE | ENABLE | ENABLE | VALUE8 |
| SV19 | VALUE3 | ENABLE | VALUE7 | ENABLE |
| SV20 | ENABLE | ENABLE | ENABLE | ENABLE |
| SV21 | VALUE4 | VALUE4 | VALUE4 | VALUE4 |
| SV22 | ENABLE | ENABLE | ENABLE | ENABLE |
| ... | ... | ... | ... | ... |

1120C  VALUE 3:
SV19.ISL.FORE.DISABLE
START 2021-05-04 22:43:56;
STOP 2021-05-04 22:46:06;

1120D  VALUE 4:
SV21.ISL.[FORE, AFT, RIGHT, LEFT].DISABLE
START 2021-05-04 22:43:56;
STOP 2021-05-04 22:46:06;

1120E  VALUE 5:
SV16.ISL.AFT.DISABLE
START 2021-05-04 22:43:56;
STOP 2021-05-04 22:46:06;

1120F  VALUE 6:
SV17.ISL.RIGHT.DISABLE
START 2021-05-04 22:43:56;
STOP 2021-05-04 22:46:06;

1120G  VALUE 7:
SV19.ISL.RIGHT.DISABLE
START 2021-05-04 22:43:56;
STOP 2021-05-04 22:46:06;

1120H  VALUE 8:
SV18.ISL.LEFT.DISABLE
START 2021-05-04 22:43:56;
STOP 2021-05-04 22:46:06;

*FIG. 12C*

SET EZ (OUTPUT PER CONSTELLATION)

1110D — ENABLE SUN SHADE

| SVn.ID.NAME | ... | SVn.SHADE |
|---|---|---|
| SV1 | | DISABLE |
| ... | | ... |
| SV16 | | DISABLE |
| SV17 | | DISABLE |
| SV18 | | DISABLE |
| SV19 | | DISABLE |
| SV20 | | DISABLE |
| SV21 | | DISABLE |
| SV22 | | VALUE9 |
| SV23 | | DISABLE |
| ... | | ... |

1120J — VALUE 9:
SV22.SHADE ENABLED
START 2021-05-04 22:43:56;
STOP 2021-05-04 22:46:06;

*FIG. 12D*

SATELLITE 5G TERRESTRIAL AND NON-TERRESTRIAL NETWORK INTERFERENCE EXCLUSION ZONES

PRIORITY CLAIM

This application is a U.S. National Stage Application under 35 U.S.C. 371 from International Application No. PCT/US2021/024456, filed Mar. 26, 2021, which claims the benefit of priority to: U.S. Provisional Patent Application No. 63/124,520, filed Dec. 11, 2020; U.S. Provisional Patent Application No. 63/104,344, filed Oct. 22, 2020; U.S. Provisional Patent Application No. 63/065,302, filed Aug. 13, 2020; and U.S. Provisional Patent Application No. 63/018,844, filed May 1, 2020; all of which are incorporated by reference herein in their entirety.

TECHNICAL FIELD

Embodiments described herein generally relate to data processing and network communication scenarios involved with satellite-based networking, such as with the use of low earth orbit satellite deployments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 10A, 10B, 10C, and 10D illustrate further views of exclusion zones implemented by a non-terrestrial communication network according to an example;

FIGS. 11, 12A, 12B, 12C, and 12D illustrate tables of settings for establishing exclusion zones in a non-terrestrial communication network according to an example;

OVERVIEW

Figure 1A:
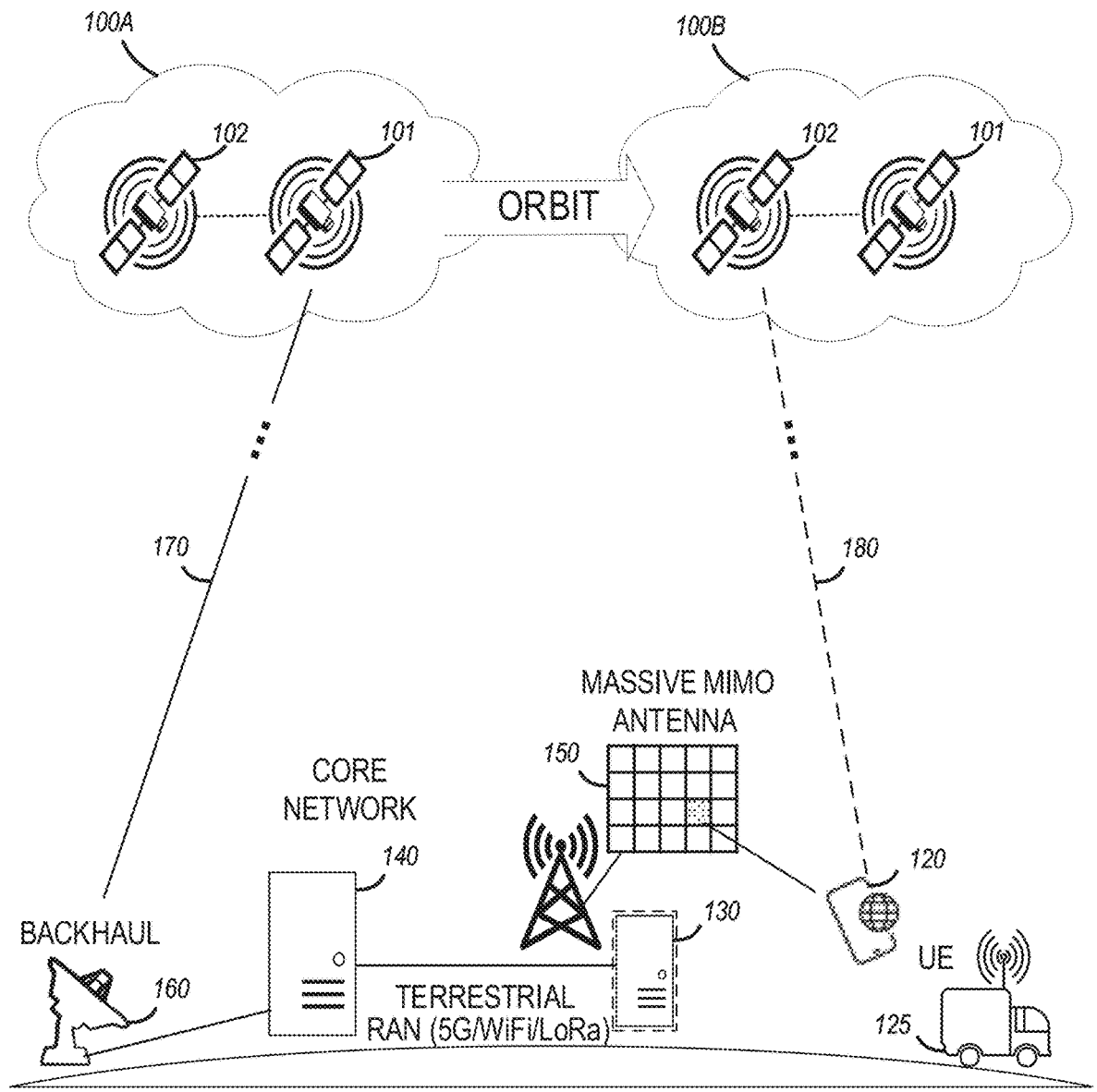
FIGS. 1A and 1B illustrate network connectivity and exclusion zones implemented among non-terrestrial (satellite) and terrestrial (mobile cellular network) settings, according to an example.

The following disclosure addresses the issue of non-terrestrial network (e.g., low earth orbit (LEO) or very low earth orbit (VLEO) satellite constellation) interference with terrestrial (4G/5G) networks, and unintended satellite broadcasts into prohibited geographic areas and other transmission/radiation sensitive areas. In one set of examples, this is provided through the use of satellite vehicle (SV)-based exclusion zones, implemented at the satellite constellation, which disable, reduce, or change satellite spot beams (signals that are concentrated in power) used to provide network connectivity.

In another set of examples, this is provided through the use of device-based exclusion zones, based on a service provider policy and implemented at the user equipment (or, implemented at the network level based on the type or characteristics of the exclusion zone), which disables or restricts access to use of satellite connectivity as instructed. For instance, a service provider policy may specify a UE device identifier, UE group identifier, or network service identifier to cause user or network equipment to enforce an exclusion zone that prevents device-satellite communications, even though the satellite spot beams will continue to be transmitted onto the geographic area. Accordingly, a satellite communications exclusion zone may be enacted for a UE or network equipment on the basis of the device, group of devices, or the type of service involved.

In another set of examples, exclusion zones are defined for the modification of communications and other settings within a satellite vehicle constellation. This includes the control of inter-satellite links among satellite vehicles (e.g., to prevent interference with higher-orbit satellite communications), or the control of light reflectors or sunshades at a vehicle to prevent unintended reflections and light pollution.

With any of these examples, various approaches are also disclosed for calculating and propagating the exclusion zone and updates to the exclusion zone. Various approaches are disclosed for use of ground-based pre-processing, or satellite-based processing. As a result, many dynamic scenarios for satellite communications including in response to requests originated by service providers (communication or cloud service providers) may be handled.

Among other aspects, the following disclosure is directed at a proposed solution to the issue discussed in 3rd Generation Partnership Project; Technical Specification Group Services and System Aspects; Study on architecture aspects for using satellite access in 5G, specifically, 3GPP TR 23.737, Rel 17, Key Issue #9, in regard to Multi connectivity with hybrid satellite and terrestrial backhaul. In that section, a multi-connectivity backhaul configuration is described as enabling a UE to connect to a radio access network (RAN) or an access network (AN), via a 5G or satellite links respectively. The 5G or satellite links then connect to a 5GC (fifth-generation core network). This type of multi-connectivity backhaul configuration is also envisioned for use with the present techniques.

The following approaches specifically explain the use of satellite-implemented exclusion zones, to avoid prohibited areas and non-terrestrial (satellite) interference between LEO satellite beams and radiation or communication sensitive equipment (e.g., airplanes, telescopes), while also ensuring regulatory and terrestrial/satellite compatibility. The following approaches are discussed with reference to networks using terrestrial based edge ground termination with a non-terrestrial network connection (e.g., Ka-band beam up and down), although the present techniques may be applicable to other connections and configurations.

As will be understood, a satellite-implemented exclusion zone caused from spot-beam enable/disable is broad and has large implications to enable or disable connectivity to many devices in a large geographic areas. This type of an exclusion zone may be augmented by the use of more granular, device-level control in a UE-based exclusion zone, particularly to address cross-country services with super-national satellite beam overlap. With the use of device-level exclusion zones, a UE can be instructed or control to turn off or disable satellite access for the device, to cause use of a terrestrial country-specific PLMN handle.

As further discussed below, either type of an exclusion zone can be implemented with a LEO constellation which has frequent (sometimes daily) routing adjustment (used to keep SVs in a correct orbit and inter satellite links-forward, aft, right, and left in alignment). For example, a daily routing adjustment may provide data that specifies either type of exclusion zones, whether processed with on-earth or in-orbit RAN functions. However, it will be understood that other methods of communicating or implementing a device-based exclusion may be provided, such as with the use of "agent" access lists (e.g., implemented with a 3GPP network).

In various examples, satellite spot beam exclusion zones may be defined and adjusted to encompass geographic areas based on service provider restrictions including billing, regulatory restrictions, communication interference considerations, service provider exclusivity, or terrestrial and satellite network compatibility. This is further complicated because LEO satellites are in motion, so the following exclusion zone definitions may be provided and coordinated to apply from satellite to satellite, as the satellites conduct their orbit.

In still further examples, the concept of exclusion zones is extended to other types of communications with LEOs, such as with the exclusion and control of inter satellite links (ISLs) which may cause interference with other satellite-earth communications. Specifically, an approach is disclosed to allow a LEO Service Provider to proactively turn off one or more ISL(s) to mitigate interference risk either from GEOs or other LEOs, as measured by power flux density per ITU recommendations, or other considerations. Constellation routing must comprehend all network nodes (ground and space) including which satellite based links are working, and which links are not, and which links may be subjected to interference especially as the number of SV increase per constellation. Thus, the definition and control of an ISL EZ may be included in routing tables that are uploaded frequently to maintain form-flying networks.

FIG. 1A illustrates network connectivity in non-terrestrial (satellite) and terrestrial (e.g., mobile cellular network) settings, according to an example. As shown, a satellite constellation 100 (the constellation depicted in FIG. 1A at orbital positions 100A and 100B) may include multiple satellite vehicles (SVs) 101, 102, which are connected to each other and to one or more terrestrial networks. The individual satellites in the constellation 100 (each, an SV) conduct an orbit around the earth, at an orbit speed that increases as the SV is closer to earth. LEO constellations are generally considered to include SVs that orbit at an altitude between 160 and 1000 km; at this altitude, each SV orbits the earth about every 90 to 120 minutes.

The constellation 100 includes individual SVs 101, 102 (and numerous other SVs not shown), and uses multiple SVs to provide communications coverage to a geographic area on earth. The constellation 100 may also coordinate with other satellite constellations (not shown), and with terrestrial-based networks, to selectively provide connectivity and services for individual devices (user equipment) or terrestrial network systems (network equipment).

In this example, the satellite constellation 100 is connected via a satellite link 170 to a backhaul network 160, which is in turn connected to a 5G core network 140. The 5G core network 140 is used to support 5G communication operations with the satellite network and at a terrestrial 5G radio access network (RAN) 130. For instance, the 5G core network 140 may be located in a remote location, and use the satellite constellation 100 as the exclusive mechanism to reach wide area networks and the Internet. In other scenarios, the 5G core network 140 may use the satellite constellation 100 as a redundant link to access the wide area networks and the Internet; in still other scenarios, the 5G core network 140 may use the satellite constellation 100 as an alternate path to access the wide area networks and the Internet (e.g., to communicate with networks on other continents).

FIG. 1A additionally depicts the use of the terrestrial 5G RAN 130, to provide radio connectivity to a user equipment (UE) such as user device 120 or vehicle 125 on-ground via a massive MIMO antenna 150. It will be understood that a variety of 5G and other network communication components and units are not depicted in FIG. 1A for purposes of simplicity. In some examples, each UE 120 or 125 also may have its own satellite connectivity hardware (e.g., receiver circuitry and antenna), to directly connect with the satellite constellation 100 via satellite link 180. Although a 5G network setting is depicted and discussed at length in the following sections, it will be apparent that other variations of 3GPP, O-RAN, and other network specifications may also be applicable.

Other permutations (not shown) may involve a direct connection of the 5G RAN 130 to the satellite constellation 100 (e.g., with the 5G core network 140 accessible over a satellite link); coordination with other wired (e.g., fiber), laser or optical, and wireless links and backhaul; multi-access radios among the UE, the RAN, and other UEs; and other permutations of terrestrial and non-terrestrial connectivity. Satellite network connections may be coordinated with 5G network equipment and user equipment based on satellite orbit coverage, available network services and equipment, cost and security, and geographic or geopolitical considerations, and the like. With these basic entities in mind, and with the changing compositions of mobile users and in-orbit satellites, the following techniques describe ways in which an exclusion zone may be defined to prevent or avoid interference between a non-terrestrial RAN and a terrestrial RAN, between multiple non-terrestrial RANs, and similar settings.

Figure 1B:
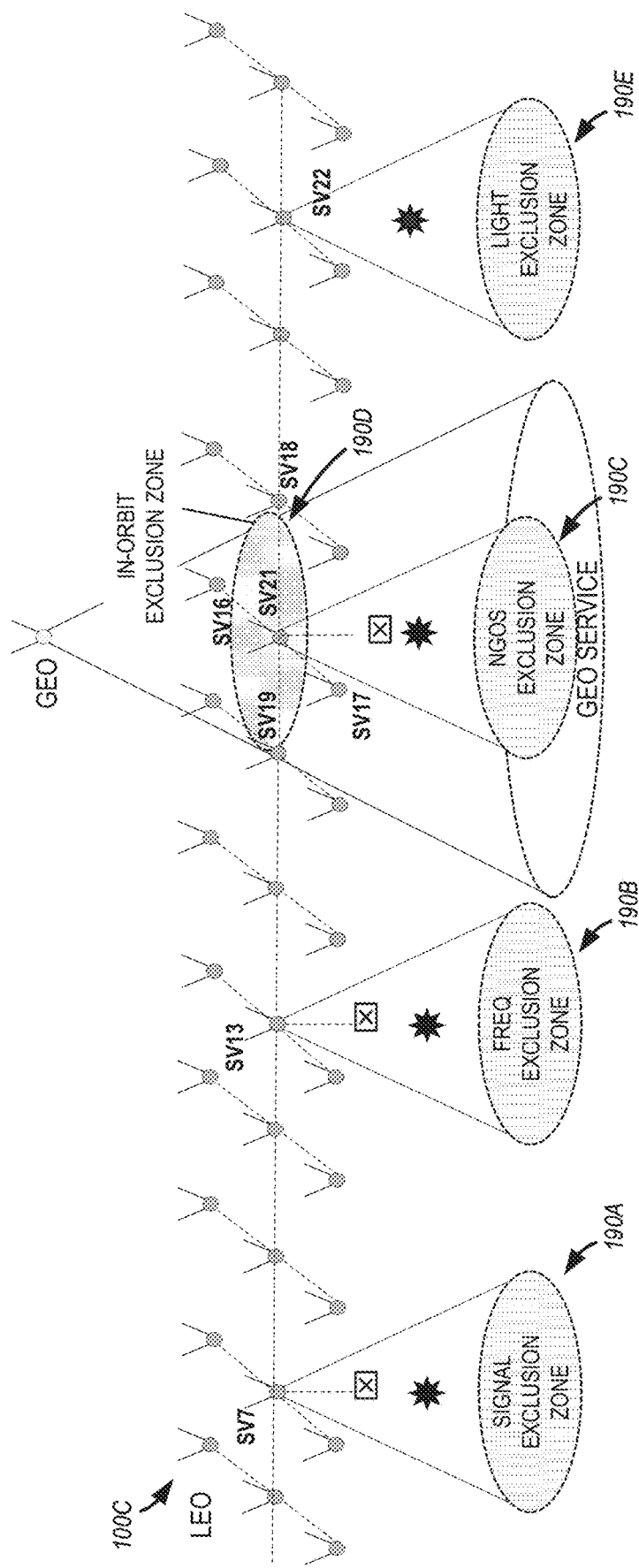

FIG. 1B illustrates further scenarios of network connectivity from an expanded view of the satellite constellation 100, at orbital position 100C, with the constellation comprising dozens of LEO satellites that provide connectivity to ground UEs (not shown). Within this scenario, a number of different exclusion zones are shown for deployment: a signal exclusion zone 190A which blocks all signals from reaching a geographic area; a frequency exclusion zone 190B which blocks certain frequency signals from reaching a geographic area; an non-geostationary orbit satellite (NGOS) exclusion zone 190C which restricts signals from reaching a certain area which overlaps geostationary satellite service; an in-orbit exclusion zone 190D which restricts inter-satellite communications which occur in an overlap of geostationary satellite service; and a light pollution exclusion zone 190E which restricts reflection or causes some light reflection mitigation effect relative to an geographic area. These exclusion zones 190A-E may be separately or concurrently deployed with one another, and are discussed in more detail in the sections below.

Figure 2A:
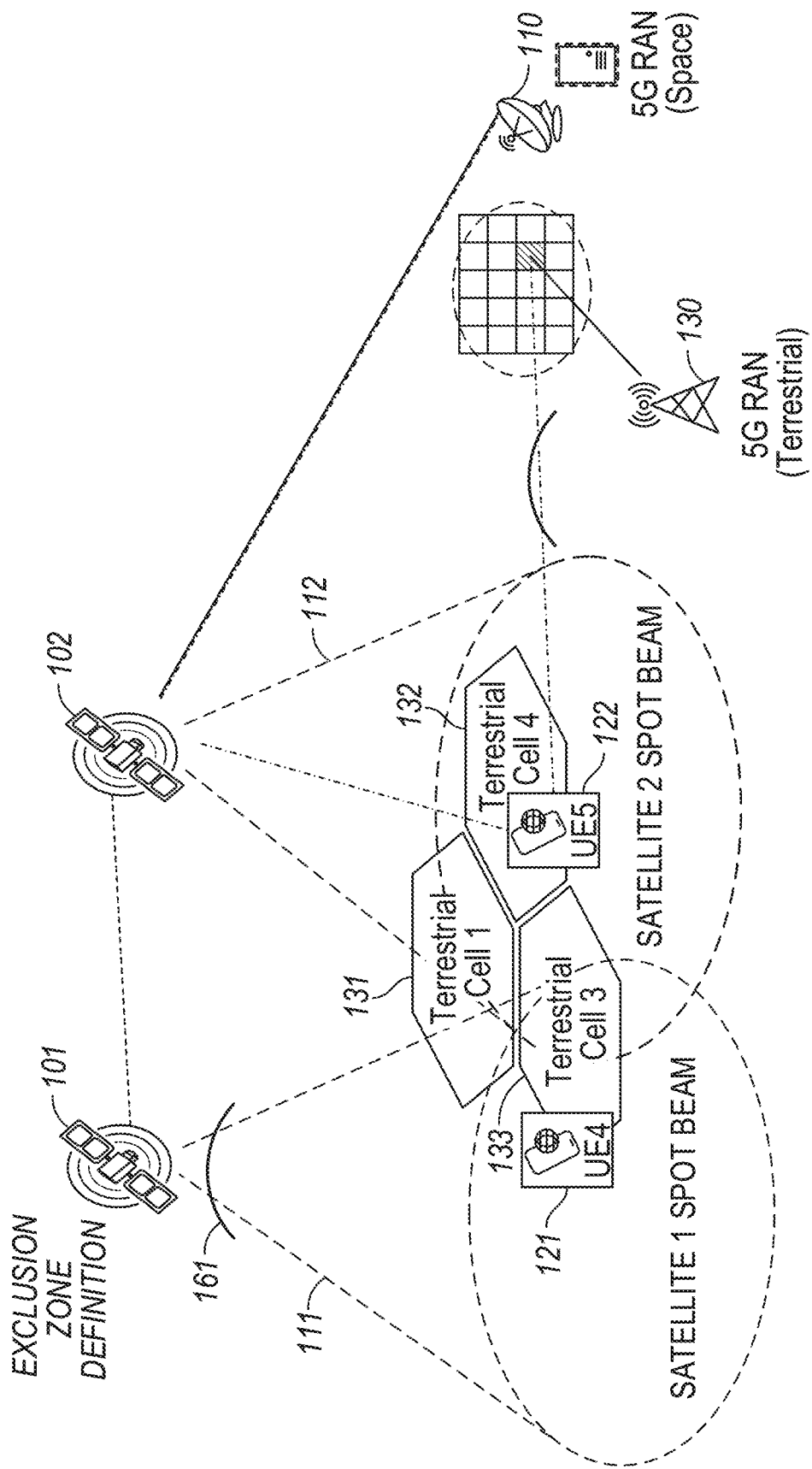
FIG. 2A illustrates a multi-access scenario for providing wireless connectivity, involving hybrid non-terrestrial and terrestrial backhaul, according to an example.

FIG. 2A illustrates a multi connectivity scenario for providing wireless connectivity, involving hybrid non-terrestrial (satellite) and terrestrial backhaul, according to an example. This drawing demonstrates, at a simplified level, the issue with hybrid connectivity scenarios, where overlapping network coverage is provided to user equipment (e.g. UEs 121, 122) from both satellite networks (LEO satellites 101, 102 which provide coverage in spot beams 111, 112) and terrestrial networks (4G/5G networks, provided in cells 131, 132, 133, and accessed by a 5G RAN 110).

In this scenario, an exclusion zone 161 may be defined: to prevent interference with one or more of the terrestrial cells 131, 132, 133; to prevent interference from the spot beam with instrumentation or devices on the ground (e.g., telescopes) or in the air (e.g., airplanes); or to prevent transmission of the spot beam entirely on the basis of incompatibility, geographic or geofence restrictions (e.g., country borders, prohibited, restricted, or sensitive areas), or other fixed or mobile considerations. In this context, various multi-operator or multi-country agreements may be established to allow, prohibit, or control access to a satellite network, even as the satellite constellation traverses over multiple operator areas and multiple countries. Additionally, in this context, service provider originated exclusion zone requests may be provided based on geo-boundaries, specific UEs, groups of UEs, or a UE service group.

Exclusion zones can address issues concerning interference to comply with regulatory provisions, frequency sharing, good faith spectrum sharing, and limitations on emission-prohibited geographic areas and other transmission/radiation sensitive geographical areas. As a result, the following exclusion zone approaches may be coordinated to assist Service Providers (including Communication and Cloud service providers) to minimize exclusion zone implementation on satellite data and control plane impacts having exclusion zone restrictions. The following exclusion zone approaches may also be used to assist Service Providers to comply with regulatory, good faith spectrum sharing, and/or to co-exist with competing access frequencies and interference scenarios.

Figure 2B:
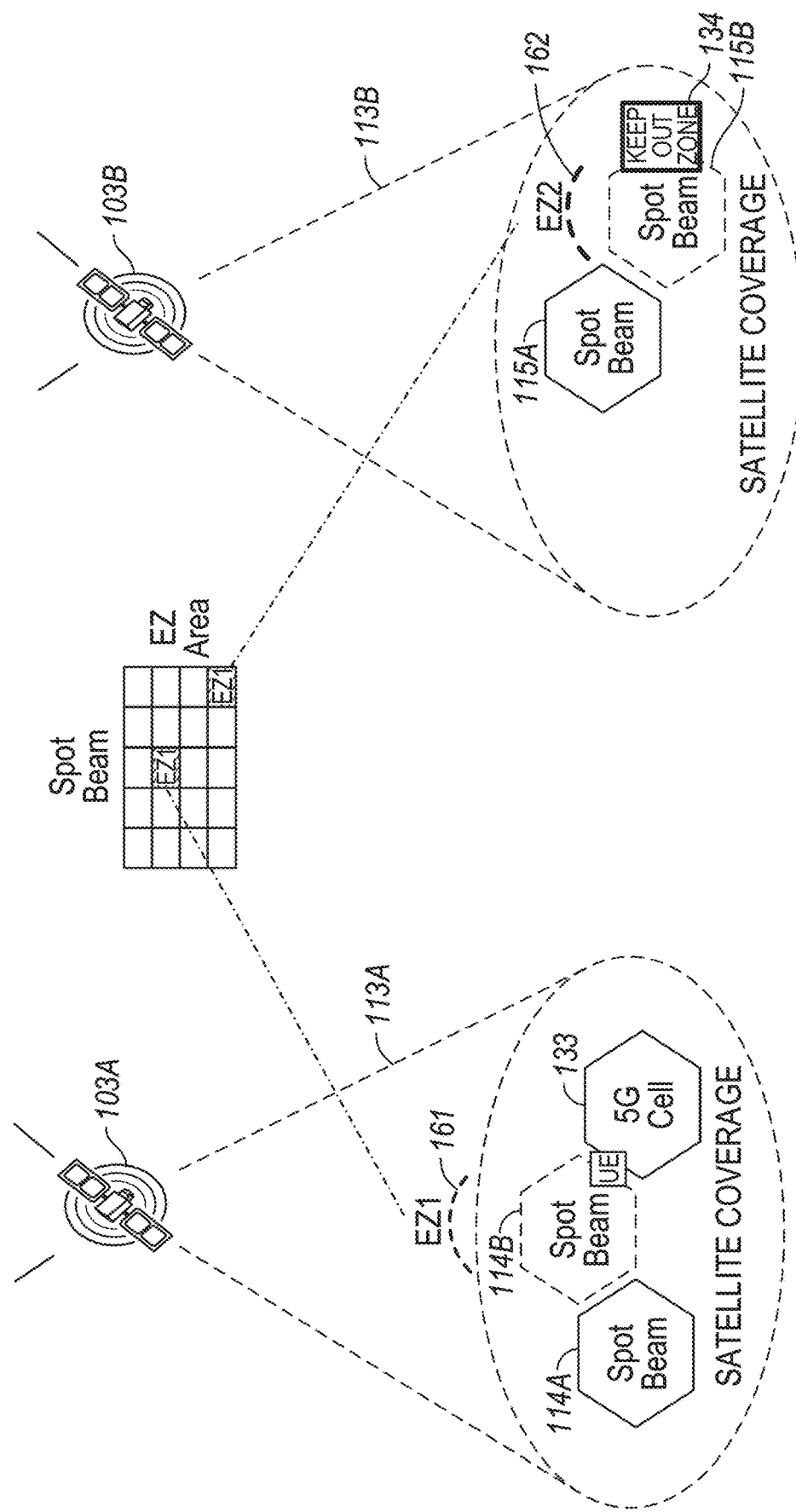
FIG. 2B illustrates a variation of a multi-access scenario for coordinating wireless connectivity among multiple types of exclusion zones, according to an example.

FIG. 2B illustrates a variation of a multi-access scenario for coordinating wireless connectivity among multiple types of exclusion zones. In one set of examples, this coordination is provided with use of SV-based exclusion zones, shown with use of exclusion zone 161 implemented with an SV 103A in the satellite constellation. The SV-based exclusion zone 161 is used to disable or reduce satellite spot beams (signals that are concentrated in power) that provide network connectivity in the coverage area 113A in an effort to avoid 5G/NGSO interference. For example, in the left scenario of FIG. 2B, one of the spot beams 114A provided by the SV 103A remains enabled, while another of the spot beams 114B provided by the SV 103A is disabled when the spot beam 114B is in proximity to or overlaps a 5G cell 133. Among other benefits, this addresses multi-connectivity/licensing contention between 5G and NGSO communications, and provides compliance with regulations or standards such as power flux density limits (e.g., ITU 22.2, ITU M.1583).

Also, as an example, in the scenario on the right side of FIG. 2B, an SV-based exclusion zone 162 is used to disable or reduce satellite spot beams that provide network connectivity in the coverage area 113B in an effort to avoid sensitive geographic area emissions. Here, one of the spot beams 115A provided by the SV 103B remains enabled, while another of the spot beams 115B is disabled when the spot beam 115B overlaps with a keep out zone 134 (e.g., defined by a geofence or other identifiable geographic area). Among other benefits, this enables compliance with sensitive geo-area emission limitations (e.g., astronomy sites as defined by ITU-R RA.769).

In a further set of examples, this coordination is provided through use of device-based exclusion zones, implemented based on service provider (Communication or Cloud Service Provider) exclusion zone policy at the user equipment. The use of device-based exclusion zones disables or restricts access to UE use of satellite connectivity, as instructed.

In both satellite access and satellite backhaul situations, the following issues can be addressed with the present exclusion zone approaches: (1) to enable a Service Provider to ensure compliance with provisions that seek to protect NGSO mobile-satellite interference including protection of radio astronomy locations (e.g., defined in ITU-R RA.769); (2) to assist a Cloud/Communication Service Provider to enforce restrictions that when required, ensure that the UE is using a core network of the country in which the UE is located; (3) to provide protection from interference between GEO and NGSO mobile-satellites, including hard limits of Earth-space, and space-Earth frequency bands and coordination between GEO and NGSO frequency bands (See ITU 22.2, ITU M.1583) including equivalent power-flux density (EPFD) considerations; and (4) to provide co-existence between terrestrial 5G and NGSO mobile-satellites, which can be carefully managed to avoid interference with earth stations. In an example, EPFD can evaluate the aggregate of the emissions from all non-GSO satellites in the direction of any GSO constellation and may provide an important regulatory and implementation consideration.

A SV-based exclusion zone, as discussed herein, may be configured to disable spot beams from individual satellites, or reduce spot beam intensity sufficient to have same effect, while also considering that (a) spot beams and terrestrial cells can overlap; (b) spot beam sizes vary; (c) the footprint of satellite coverage (by individual vehicle and constellation) varies; and (d) the footprint of satellite coverage overlaps among multiple satellite vehicles. A UE-based exclusion zone, as discussed herein, may be configured to disable access or connectivity with a particular satellite, satellite constellation, or satellite radio. To overcome these considerations, different scenarios and dynamic properties of exclusion zones may be implemented as discussed below.

Types and Scenarios of Exclusion Zones

Existing techniques do not address overlap sufficiently to prevent terrestrial and satellite networks from conflicting. Accordingly, the issue of interference is expected to be relevant to a variety of satellite deployments as the next wave of satellite providers work to augment their terrestrial networks (e.g., 4G LTE, 5G) with non-terrestrial (e.g., satellite VLEO, LEO, GEO, MEO) networks. Interference caused from unintended satellite transmissions can occur in stationary scenarios (e.g., regulatory, observatory prohibitions) or motion scenarios (e.g., airplane) or both. Likewise, interference between satellite uplinks (e.g., Telemetry Tracking and Control—TACS) and non-terrestrial network satellites could lead to communication interference, especially with aircraft passing through downlinks.

Related issues that are also not addressed in existing scenarios include handoff and connectivity between eNBs/gNBs of Terrestrial Networks and satellite constellations, such as when the UE location is available or unavailable for satellite geographic footprints relies on the ability to navigate or avoid interference. Existing approaches have not attempted to coordinate operations of terrestrial and non-terrestrial networks in a way that fully prevents interference or unintended reception of signals.

In the following paragraphs, two types of exclusion zones are discussed: satellite-vehicle-based exclusion zones (also referred to as a "SV-based" exclusion zone) and device-based exclusion zones (also referred to as a "UE-based" exclusion zone). An SV-based exclusion zone refers to the control of a transmission from the satellite, such as to turn off a spot beam in a prohibited geographic area, or exclude or turn off a particular frequency band within a spot beam. A UE-based exclusion zone refers to control of the reception of the satellite transmission at the receiving device, such as to turn off a satellite radio or disable communication with a satellite in a prohibited geographic area. While these two approaches are generally complimentary, they may also be implemented in combination, such as is shown in FIG. 5A and discussed further below.

As will be understood, exclusion zone requirements and implementations may vary between geographic area, as well as cloud or communication service providers. For instance, consider a scenario where a communication service provider requires an exclusion zone that restricts data and beams according to Landing-Rights/Regulations and or service provider policy. To address such variation, the following SV-based and UE-based exclusion zones may be coordinated and used in combination. This enables a low touch approach that folds exclusion zone maintenance into constellation operation and maintenance routing), while supporting satellite spot beam and UE device granularity, and considering unplanned restrictions, inclusive of cloud service provider and communication service provider sensitivities.

Figure 3:
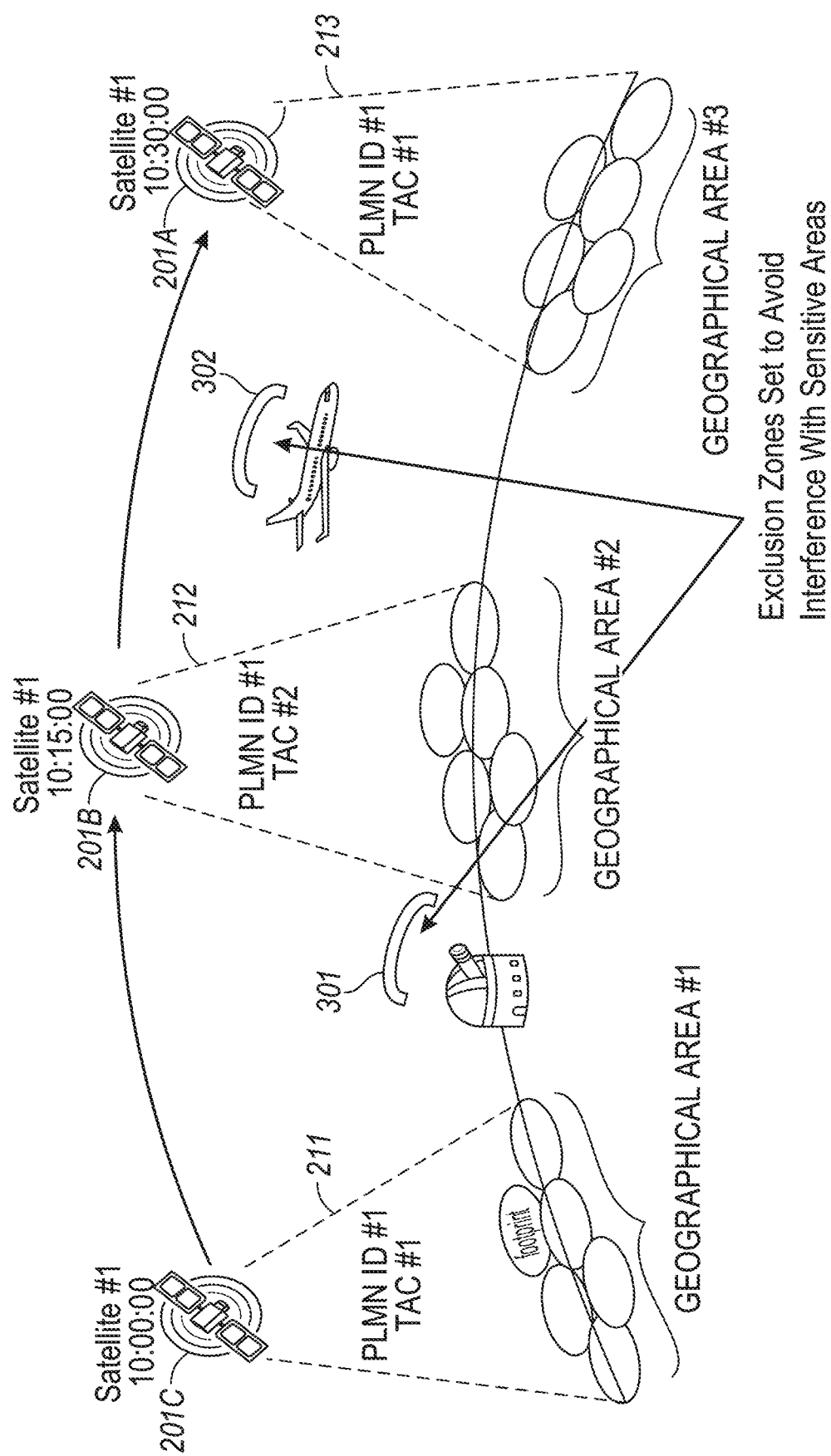
FIG. 3 illustrates an implementation of exclusion zones for a non-terrestrial communication network, according to an example.

FIG. 3 illustrates an implementation of SV-based exclusion zones for a non-terrestrial communication network, according to an example. This drawing provides additional detail on an example deployment of exclusion zones, over time, relative to a satellite 201 at orbit positions 201A, 201B, 201C. At position 201A, the satellite 201 provides coverage of its spot beam(s) in a first geographic area 211; at position 201B, the satellite 201 provides coverage of its spot beam(s) in a second geographic area 212; at position 201C, the satellite 201 provides coverage of its spot beam(s) in a third geographic area 213.

FIG. 3 shows the implementation of a first exclusion zone 301, which is a fixed geographic exclusion area. A fixed geographic exclusion area may be appropriate for preventing overlap with terrestrial networks which would conflict (e.g., cells established from a 4G/5G mobile network), or a fixed areas which is designated to instructed to be avoided (e.g., other countries, radio silence areas, sensitive monitoring equipment such as radio telescopes). FIG. 3 further shows the implementation of a second exclusion zone 302, which is a mobile geographic exclusion area. A mobile geographic area may be appropriate for objects or areas which are in motion, moveable, or whose position is not necessarily fixed in a specific geographic area (e.g., airplanes, drones, other satellites), or for an area that has an irregular or changing shape. The implementation of either type of exclusion zone prevents the satellite from beaming on the area of conflict or restriction.

Characteristics of Exclusion Zones. In an example, an SV-based exclusion zone may be defined to include or consider the following properties:

First, an exclusion zone may be defined to effectively prevent satellite vehicle (SV) spot beam radiation over a geographical area or airspace (e.g., airplanes or drones in-flight). This may be implemented by providing pre-calculated coordinates of when the satellite is designated to turn off (e.g., times that are calculated by a satellite controller) based on orbital and positioning data of the SV; or, the SV may include calculation logic, executable by on-board circuitry, to calculate the designated times to turn off, based on orbital and positioning data and telemetry values.

Additional complexity may occur in satellite constellation settings due to the size and implementation of an exclusion zone from among multiple SVs. Exclusion zones may be fixed but LEO Satellites are in motion, so an exclusion zones needs to be coordinated from satellite to satellite in multi-satellite constellations (with sufficient overlap or variance considerations) in order to ensure that the exclusion zones applies to multiple vehicles.

An SV-based exclusion zone must be followed even as LEO satellite constellations are reliant on inter-satellite links and satellite to terrestrial links including UE stop beams. Additionally, an exclusion zone must be followed even as LEO constellations must maintain inter-satellite links. However, an exclusion zone must also include some variability or flexibility. Solar flares, spare replacements, and atmospheric issues can impact the orbit and flight path of LEO satellites more so than GEO satellites, because LEOs are closer to the earth. Thus, variability in the orbit or flight path may affect implementation of the exclusion zone and the necessary calculations to implement the correct (minimum) area of exclusion.

Figure 4B:
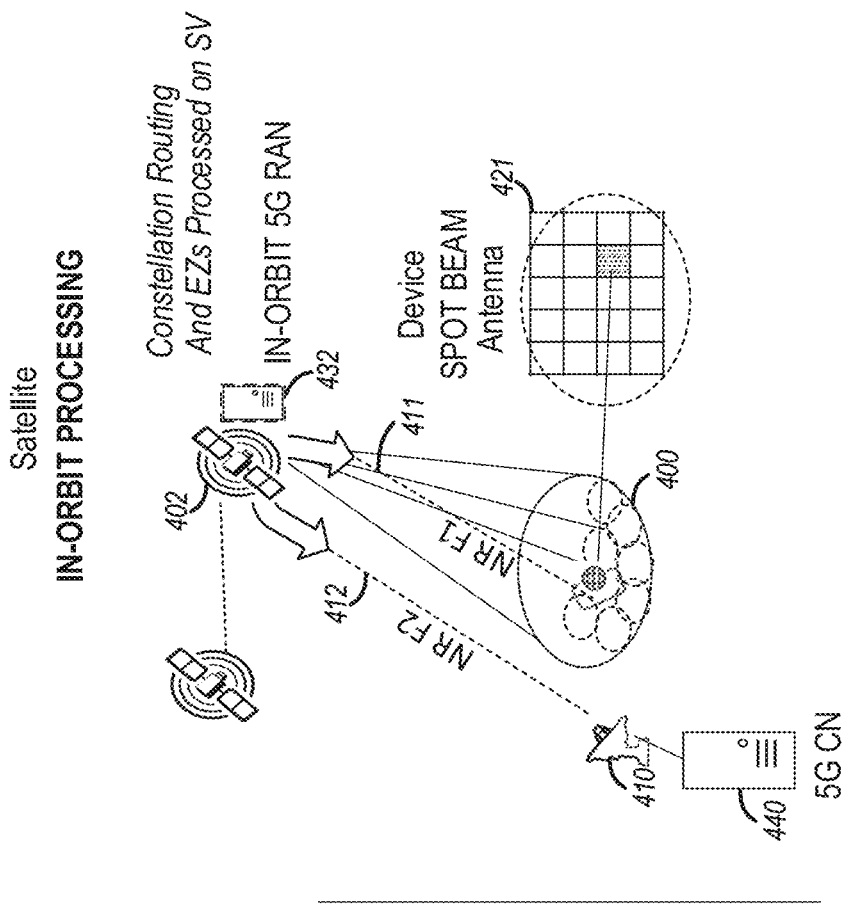
FIG. 4B illustrates an in-orbit data processing environment, according to an example.
Figure 4A:
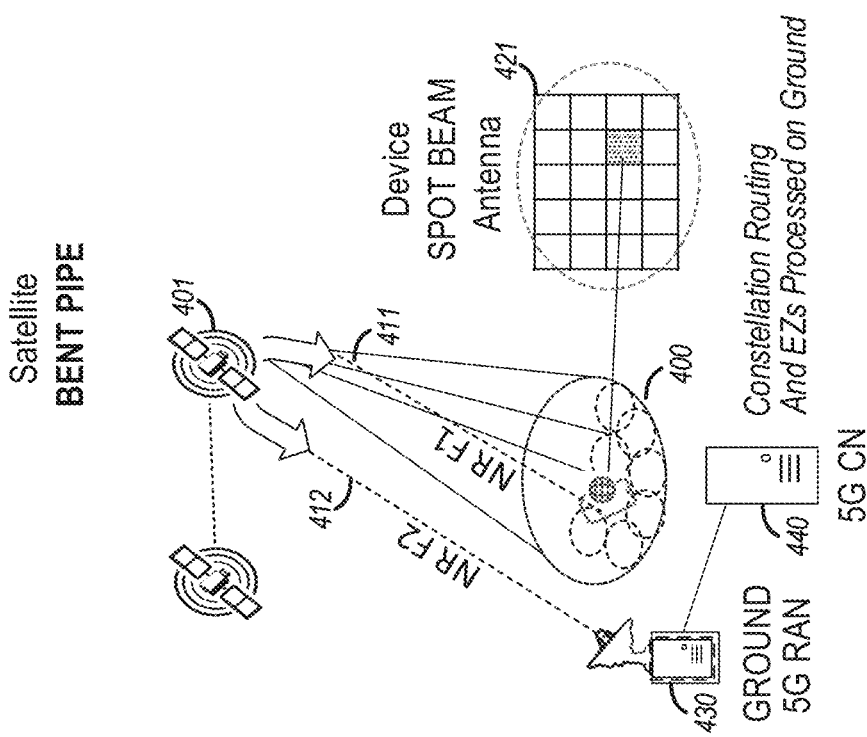
FIG. 4A illustrates a satellite bent-pipe data processing environment, according to an example.

FIG. 4A illustrates additional features of a satellite "bent-pipe" data processing environment, in a scenario where the gNB is located on Earth. Here, the reference to a "bent-pipe" is provided to emphasize how the satellite constellation is used as a relay for network connectivity. As shown in this environment, a satellite 401 of a constellation provides satellite connectivity coverage from a spot beam 400. This spot beam 400 may include broadcasts that provide coverage to a plurality of connected devices, such as respective UEs. The spot beam 400 may be received by a spot beam antenna 421, even as the spot beam delivers connection links to the UE and a plurality of other devices (not shown) in the spot beam coverage area.

In the scenario of FIG. 4A, the connection between the UE and the satellite 401 is provided using the NR F1 interface 411 (many:to:many, sub 6 GHz, e.g., 3.5 Ghz link); the connection between the satellite 401 and the ground backhaul network is provided using the NR F2 interface 412 (high frequency cm and mm wave, using a one:few point-to-point link such as a backhaul link). This backhaul network, in turn, connects the satellite to a ground-based (terrestrial) 5G radio access network (RAN) 430, and a 5G core network (CN) 440. In this scenario, constellation routing and exclusion zones are processed in one or more computing systems on ground (such as at the 5G RAN 430, the 5G CN 440, or other entities not shown).

FIG. 4B illustrates additional features of an in-orbit data processing environment, in a scenario where the gNB is located in orbit. Here, the reference to "in-orbit" is provided to emphasize how processing occurs at the non-terrestrial network (at the SV 402, or at other entities in the constellation including the SV 402). For example, the constellation routing and exclusion zones may be processed directly at one or more of the SVs of the constellation; the constellation may also include in-orbit 5G RAN functions 432 which directly coordinate and control data transmissions and the uses of the satellite radio links.

In the scenario of FIG. 4B, the connection between the UE and satellite 402 is also provided using the NR F1 interface 411, and the connection between the satellite 402 and the ground backhaul network is provided using the NR F2 interface 412. However, this backhaul network directly connects to a 5G CN 440, as much or all of the 5G RAN functionality is performed at the in-orbit 5G RAN functions 432.

FIG. 5A illustrates satellite exclusion zones in a bent-pipe data processing environment, similar to that described with FIG. 4A, using a satellite vehicle-based exclusion zone 501 and a device-based exclusion zone 502. In this scenario, constellation routing and exclusion zones are identified and processed on the ground (e.g., at the 5G CN 440), and communicated to the satellite and devices via the satellite links. The use of an SV-based exclusion zone 501 will turn off the entire satellite beam for broadcast, as provided from a SV antenna 511; the use of a UE-based exclusion zone will instruct the device antenna 512 (cellular network connection) to discontinue or avoid use of the satellite beam.

Figure 5B:
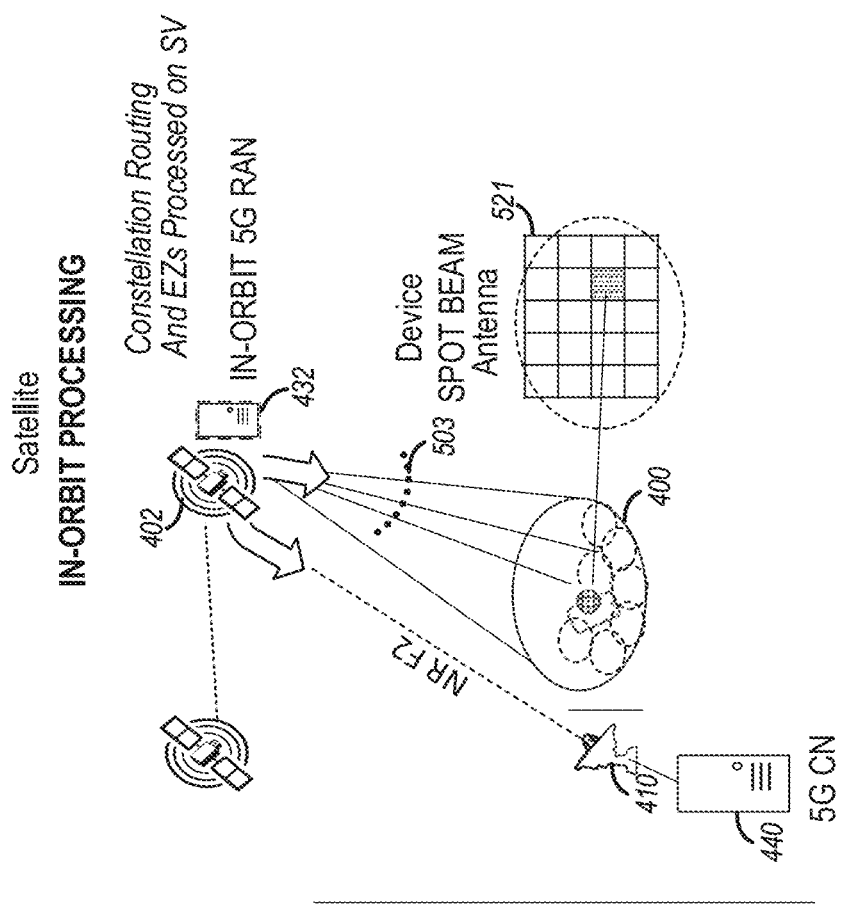
FIG. 5B illustrates satellite exclusion zones in an in-orbit data processing environment, using a satellite vehicle-based exclusion zone, according to an example.
Figure 5A:
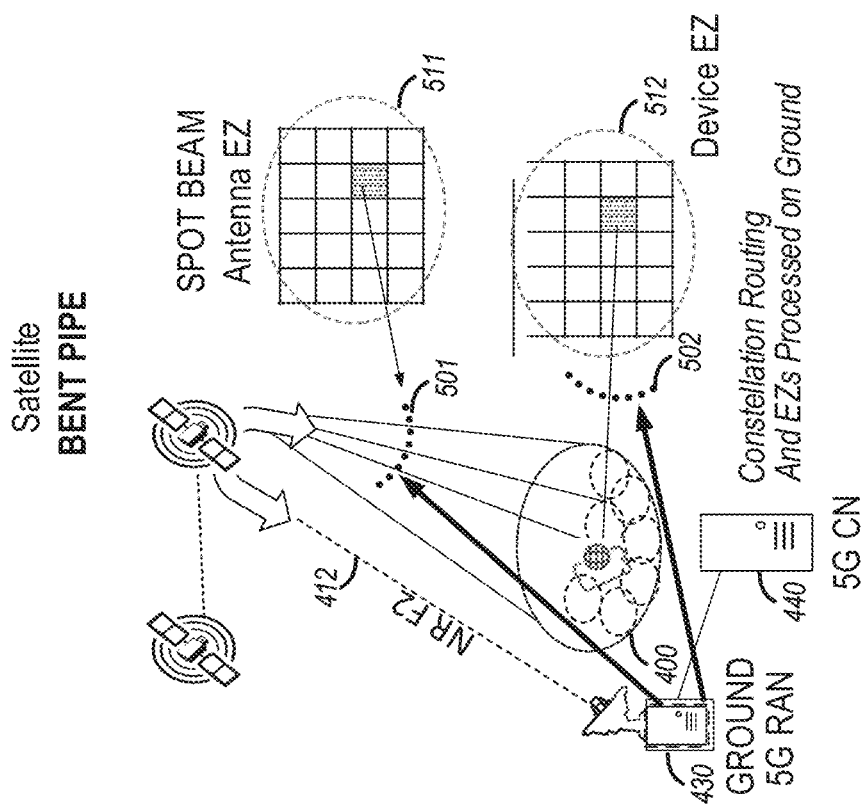
FIG. 5A illustrates satellite exclusion zones in a bent-pipe data processing environment, using a satellite vehicle-based exclusion zone and a device-based exclusion zone, according to an example.

FIG. 5B illustrates SV-based exclusion zones in an in-orbit data processing environment, similar to that described with FIG. 4B using a satellite vehicle-based exclusion zone 503. Because constellation routing and exclusion zones can be processed at the 5G RAN 432 of the SV, the exclusion zone can be accurately tailored to the precise area of the spot beam 400, as received by the device spot beam antenna 521.

In an example, data to instruct an SV to implement an SV-based exclusion zone (e.g., exclusion zone 501, 503) may be provided through the use of routing updates. Routing table updates are necessary to keep the constellation connected and ensure data is routed with efficiency; additionally, routing updates for LEO satellites are typically pre-determined in advance based on current constellation health of individual SVs. Routing table updates are also based on telemetry of individual satellites (e.g., battery health) and or atmospheric issues, and routing table updates are usually uploaded at certain locations on the earth on a regular basis (e.g., daily).

In an example, an SV-based exclusion zone is applied to follow the frequent routing table updates and are directed at satellite beam to Earth footprints, even as spot beam footprint size varies and improves with technology advances. To be effective, such an exclusion zone must be determined and applied to each SV in the flight-path of a targeted exclusion area.

Exclusion Zone Calculations. In an example, to implement an SV-based exclusion zone, each SV in a LEO constellation will need to effectively disable the spot beam over the targeted exclusion area at a particular time. Some constellations will have multiple passes of the same series of SVs each time, and thus need to disable the spot beam based on orbital data trajectories that are available at the time when the SV routing tables are uploaded to the constellation.

In most scenarios, information for implementing exclusion zones, either via disabling satellite beams and or reducing intensity, may be provided to the SVs based on the fact that routing tables have to be updated frequently for LEOs. Constellation maintenance routing tables typically, depending on the constellation, require frequent (daily) updates to position SV, reroute traffic, respond to maintenance requests, inclusive of satellite to earth as well as intersatellite links. Thus, exclusion zones can be factored in at the same time as these routing table updates to minimize overhead. However, complexity may occur based on mobile geographic exclusion areas, such as an exclusion area which follows an airplane flight path. Exceptions can occur for unforeseen circumstances such as flight path changes, storms, or a cancelled/delayed flight. Likewise, variation may occur depending on the characteristics of the constellation or the service provided by the commercial satellite network provider, or the capabilities or features of the SV "node" that provides specific compute, acceleration or storage capabilities, and whether the exclusion area is not needed. Out-of-cycle (e.g., emergency) exclusion zones and dynamically calculated exclusion zones may also be provided to accommodate impromptu requests, flights, weather conditions, or the like.

Due to LEO satellite speed and orbit shifts, exclusion zone calculations may be pre-determined and uploaded to the SV on a regular basis. As one example, exclusion zone calculations may be implemented and calculated based on pre-determined aircraft flight plans (e.g., to automatically not interfere with known aircraft). As another example, exclusion zone calculations may be more dynamic in the case of unplanned aircraft or military flights (e.g., to be dependent on current airplane coordinates).

Satellite operators often qualify for real-time flight tracking data that, used together with pre-existing flight plans, can generate exclusion zones hat are used to disable the spot beam radiation at a particular instance in time. Exclusion zone calculations may be derived from commercial and military sources (e.g., NORAD, NASA, Flight control data) that are applied to both non-terrestrial network inter-satellite on-board routing tables, geo localized terrestrial network eNB, and or individual UEs registrations within the localized areas (either when the location is known or unknown). Orbital data of the non-terrestrial network is used together with the exclusion zone requirement to identify areas to exclude. Exclusions are then integrated into operational constellation routing tables and uploaded, as part of normal infrastructure maintenance, into on-board routing tables of the non-terrestrial network constellation(s) as well being communicated as a localized local RAN access point (e.g., eNB).

Exclusion zones may be used to prevent satellite operators from providing services in particular countries or jurisdictions, thereby generating large footprint exclusion zones. Exclusion zones also may be used as a keep-out-zone between a static or in-motion UE and a terrestrial eNB or between a terrestrial eNB and a non-terrestrial network. Non-terrestrial network satellite footprint size, capacity, and change frequency depends on the type of satellite. To handle either type, UE mobility registrations with particular non-terrestrial network satellites can be changed or switched to a terrestrial network when exclusion zone interference or interruption is expected.

LEO non-terrestrial constellations often rely on inter satellite communications links that are directed at nearby satellites using available antennas. Earth bound communications from a LEO satellite constellation rely on the strategically placed, typically static, TTACs that serve as the gateway into the TR. As satellite technology evolves to allow direct line-of-sight communications to UEs, exclusion zones can be localized into the geographic areas covered by specific LEO satellites and available eNB TN connections.

Additionally, exclusion zones may be used to avoid L-band (not backhaul that is fixed Ka-band Earth terminals) interference. This interference can be between slow moving Earth UE mobile devices or fast-moving devices (autos and airplanes), with the exclusion zone being used to prevent communication disruptions, and accommodate regulatory restrictions such as cross-country provisioning and handoff.

Finally, an exclusion zone can be extended between LEO satellites in the same constellation or different (competitive) consolations requiring cross-satellite fore-aft-right-left antennas to be disabled although this scenario may be reserved for extreme conditions based on the network disruption potential.

It will be understood that exclusion zones may be coordinated or defined according to various interference limits and standards. For example, exclusion zones may be implemented based on ITU 22.2 and M.1583 standards which relate to power flux density and interference limits, including in scenarios where overlap exists between GEO and NGSO constellations. Likewise, exclusion zones may be implemented based on ITU R 769 standards which recommend geo-sensitive emission protections for radio astronomy interferences. Other mechanisms for ITU compliance and attempts at good faith measures to limit interference may also be considered.

Exclusion Zone Implementation Examples

The previously described EZs have been described with reference to Geographical Area Avoidance (e.g., with SV-based exclusion zones) and Multi-Connectivity Interference Avoidance (e.g., with UE-based exclusion zones). Accordingly, either type of EZ may be used for restricting emissions in geographical sensitive areas and terrestrial/non-terrestrial restrictions either in response to regulatory or Service Provider Policies and or recommendations. Additionally, special consideration may be given for minimizing the impact of incorporating EZs to mitigate any adverse effects of QoS with satellite user and control traffic.

The following implementation examples demonstrate how Service Providers (Communication and Cloud) can minimize EZ implementation on satellite data and control plane impacts incorporating EZ restrictions; and how Service Providers can comply with regulatory issues, good faith considerations, and/or co-existence with competing access frequencies and interference conditions. Exclusion zones may be implemented in support and alignment with 5GS with regenerative satellite enabled new radio (NR) NR-RAN, with inter-satellite links for regional or global coverage architecture, payload routing and switching calculations are performed the uploaded for virtual spot beam allocation comprehending inter-satellite links and ground station availability.

An implementation example may include the following operations:

1) Identify an EZ for a Mobile Geographical Area;
2) Receive an indication of change to the Mobile Geographical Area;
3) Calculate a new EZ and routing table upload actions based on change, orbital/positioning of satellites;
4) Communicate routing tables with new exclusion zones, routing table upload; and
5) Implement updated exclusion zone at satellite vehicle, or constellation via TTAC.

In more detail, operations are performed to: identify fixed geographic areas for exclusion (operation 1); identify mobile geographic areas or entities for exclusion (operation 2); calculate operational actions for the SV based on geographic areas, and orbit/positioning data of satellites (operation 3); and communicate operational actions to satellites with routing table updates (operation 4). The operations then conclude with the implementation of the exclusion zone at the satellite vehicle(s) or constellation (operation 5).

With operations 1) and 2), the exclusion zone may be determined based on earth coordinates; even if it is an airplane or other mobile object, the exclusion zone is calculated based on a projection to an earth location for simplicity. Then, with operation 3), the flyover orbital data and intensity is used to pre-determine which spotbeam, antenna array, or equivalent broadcasting structure may be turned on or off or reduced. For example, the adjustment may involve reducing intensity below a threshold indicated by the regulatory agency, a Service Provider agreement or Policy.

Operations 1) to 3) may involve various terrestrial (on-earth) actions to calculate and update the operational routing table to reflect the calculated exclusion zones. Then, operation 4) may involve uploading the constellation routing table, while line of sight of a single satellite or constellation telemetry tracking and control.

Operations discussed to calculate the exclusion zones on Earth and propagate the exclusion zone changes (via a routing table update, related to operations 3) and 4) or other mechanisms) may be performed on an urgent/rush basis. In other examples, the calculation of the EZs may be performed on the satellite vehicle, provided that sufficient computing resources and orbital data is available to the vehicle. Such computing resources may be provided with on-board computing provided by the SV.

In any of the examples discussed herein, it will be understood that the shape, size, geometry, contours, or characteristics of the exclusion zone may be irregular, variable, or obscured. For instance, an exclusion zone may be established from a combination of geometries, or fragments/portions of an exclusion zone, such as in a situation where characteristics of the possible interference area repeatedly change or are unable to be resolved to a precise boundary. Likewise, an exclusion zone may be established from a dynamically variable and changing target, such as in a situation where a government or private entity (e.g., a third party) wishes to block satellite communications over a confidential facility but does not wish to disclose the specific coordinates or area of this facility. Finally, although many of the examples of exclusion zones are identified and illustrated with reference to a circular area for reception and exclusion, it will be understood that a variety of other geometric shapes may be used to define, implement, and apply exclusion zones. The shapes and sizes of such communications also may be defined and communicated in multiple fragments or pieces (including those that add onto, or subtract from, another defined exclusion zone). Consistent with the examples herein, compute of exclusion zone fragments or portions zones may be done on-ground, in the satellite, or in a trusted location, depending on the security or processing needs of the relevant entities.

In various examples, the following exclusion zone definitions and changes may be provided: as an exclusion zone implementable per-device/UE (e.g., based on a device identifier); as an exclusion zone implementable per-spot beam; as an exclusion zone implementable via UE or via spot-beam, to "turn-off/turn-on" based on information communicated within the satellite routing tables (that need to be updated frequently for LEO constellations); as an implementation of control of the exclusion zone based on a projected intensity of spot-beam (e.g., low intensity "on" may be acceptable depending on country radiation threshold); as implementation of the exclusion zone using terrestrial-based RAN processing, using in-orbit RAN, or a combination of both; or as an implementation of the exclusion zone with different RAN Ground Station backhaul options, including but not limited to fiber, microwave, satellite links (including links with LEO/GEO satellites).

The following outlines various examples of pseudocode and data parameters which may be used for commands and responses to communicate exclusion zone information for these implementation examples. As software and routing processing payloads continue to gain traction among cloud service providers, exclusion zone calculations and instructions are likely to be performed on the ground due to the computation power needed. However, such calculations may also be performed on-satellite in other examples.

Example: Set Exclusion Zone (EZ)

The following command may be used to establish predetermined EZs to prevent satellite vehicle SV s

TABLE 1

| Parameter | Type | Comments |
| --- | --- | --- |
| EZ.id | INT | Unique EZ ID |
| EZ.name | STRING | EZ Name |
| EZ.ground.radius | FLOAT | Ground radius for EZ area calculation |
| EZ.ground.lat | FLOAT | Ground point latitude for EZ area calculation |
| EZ.ground.long | FLOAT | Ground point longitude for EX area calculation |
| EZ.ground.IP | FLOAT | Ground point IP Address for EZ area calculation |
| EZ.ground.GPS | FLOAT | Ground point GPS Location for EZ area calculation |
| EZ.min.intensity | FLOAT | Min Ground point elevation intensity threshold |

Example: Get SV Footprint

The following command may be used to obtain Satellite Vehicle future (fly-over) positions relative to a ground location.

TABLE 2

| Parameter | Type | Comments |
| --- | --- | --- |
| SV.id | INT | NORAD Satellite Vehicle unique ID |
| GND.lat | FLOAT | Ground location latitude for SV fly-over |
| GND.long | FLOAT | Ground location longitude for SV fly-over |
| GND.alt | FLOAT | Ground location altitude % for intensity threshold calculations |
| GND.time | INT | Amount of time to obtain SV flyover(s) |

Example: Response from Get SV Footprint

The following command may be used as an expected response from fly-over telemetry readily available via NORAD or from a constellation service provider.

TABLE 3

| Parameter | Type | Comments |
| --- | --- | --- |
| SV.id | INT | NORAD Satellite Vehicle unique ID |
| SV.name | STRING | SV name |
| SV.footprint.lat | FLOAT | Center latitude point of expected beam footprint |
| SV.footprint.long | FLOAT | Center longitude of expected beam footprint |
| SV.footprint.radius | FLOAT | Radius of expected beam footprint |
| SV.time | INT | Expected time beam footprint radiation |
| SV.min.intensity | FLOAT | Altitude of beam footprint for intensity calculations |

Example: Calculate EZ Impact on SV

The following method may be used to determine whether a fly-over satellite will overlap an EZ. A satellite can have a large coverage area; many beams of the same satellite can be within the larger satellite coverage area, and the EZ area is fixed on the earth (EZ.n.area) whereas the individual satellite beam is defined as the SV.n.fly-over.area.
(1) Does SV.n.fly-over overlap/intercept with EZ.n.area ?
(2) If Yes, is SV.min.intensity>EZ.min.intensity ?
(3) If Yes, then prepare to turn-off SV beams, or lower intensity in accordance with a service provider agreement, by using Set SV EZ. (Intensity can be lowered instead of turned off entirely).

Example: Set SV EZ

The following command may be used to prepare Satellite Vehicle maintenance routing tables to turn-off (or reduce intensity of) particular satellite beams from EZ Impact on SV calculation, to effect an SV-based exclusion zone.

TABLE 4

| Parameter | Type | Comments |
| --- | --- | --- |
| SV.id | INT | Satellite Vehicle ID (e.g., NORAD id) |
| SV.EZ.spotbeam.id | INT | Satellite spotbeam id |
| SV.EZ.duration.start | FLOAT | Turn-off spot beam START time |
| SV.EZ.duration.stop | FLOAT | Turn-off spot beam STOP time |
| SV.EZ.method | INT | ON/OFF or Intensity reduction (e.g., based on service provider SLA) |

Additionally, the following parameter may be provided in the Set SV EZ command to establish a Device ID, to disable a particular device based on country location boundaries, to effect a UE-based or group of UE-based exclusion zone:

| Parameter | Type | Comments |
|---|---|---|
| Device.ID | INT | Device Identifier (e.g., unique identifier of mobile smartphone, car, etc. |
| Group.ID | INT | Device is part of a UE-group based on service specific restrictions (e.g., streaming service, autonomous car provider, or any grouping of UEs) |
| Service.ID | INT | Service is part of a restricted application (e.g., messaging or streaming app) |
| Latency.ID | INT | Latency based exclusion based on high/low latency restrictions |

In an example, the specification of the Device ID for a Device "N" will specify that that DEVICE "N" is NOT allowed to access to satellite network; such as because the device is located in another country. As a result, the device "N" will instead be forced to use the local PLMN (Public Land Mobile Network), where UE is part of a Group, and UE is part of a Service. Other methods or formats of communicating device identification information for use with UE-based exclusion zone may also be provided.

It will be understood that the communication of device identification information can be defined as a method of exclusion (exclusion list) or inclusion (trusted/inclusion list) with the use of satellite radio. The described use with the Set SV EZ command enables both satellite constellation routing parameters and UE-based exclusion zones to be defined and coordinated at the same time (e.g., on the ground, by a same entity).

It will also be understood that the use of UE-based exclusion zones will provide an impact on existing nodes and functionality for RAN nodes. For instance, RAN nodes may be adapted to consider, among other aspects, the current QoS requirements for the ongoing data flow and the type of target radio access technology node candidates (non-terrestrial network or not) when deciding the target radio access technology node for a handover.

In further examples, the use of satellite routing protocols may be computationally intense and will be performed on-ground. Some of the examples of routing algorithms which may be used to calculate satellite routing may include: Finite State Automata (FMA), Priority-Based Adaptive Routing, and Predictive Routing Protocols. These algorithms will produce satellite vehicle routing/switching payload updates that will reflect exclusion zones before upload to a single line-of-sight SV (at ground station) or at Telemetry Tracking and Control (TTAC) locations for the constellation (that are typically not directly under one SV). Any routing protocols can be used with the present techniques, however, when the exclusion zone is defined and established before upload.

Together the routing protocols and exclusion zone combination can be used to establish and represent a virtual software-defined network (SDN). Such a virtual SDN may include coordination of terrestrial and non-terrestrial aspects, through use of SV-based and UE-based exclusion zones. Other aspects of a virtual SDN may include definition of virtual beams, coordination with other terrestrial networks, and the like.

Variations in Exclusion Zones

It will be understood, that due to the variability in orbits, beam sizes, mobile networks, and other factors discussed above, uncertainties may apply to exclusion zones. Exclusion zone accuracy depends on the capabilities of the satellite spot beams, accuracy of the constellation telemetry, orbital data, international agreements, and in some cases the ability to alter constellation flight plans or traffic rerouting. However, spot beam accuracy will serve as a key factor as to how accurate the exclusion zone will be.

If there is a need for an extended exclusion zone in the case when a country or jurisdiction does not grant any permission to beam (radiate) on their territory, or perhaps the jurisdiction does not want the satellite to interfere at all with their terrestrial networks, the exclusion zone will be best effort and sustained. The country may ask for audit records and the like if that is allowed.

Additionally, some satellite networks have their own country code (although they are not a country and operate independently and must gain permission to radiate). In connection with 3GPP access, the terrestrial system may control access to constellations so there may be contention there that has not been vetted.

An exclusion zone may also be implemented in the form of an entire no-fly zone type of implementation, such as may occur in constellations that have many satellites in which the entire constellations would need to be adjusted to implement an exclusion zone.

An exclusion zone may also be implemented with the exclusion of particular frequency bands, beam intensities, or other changes to the characteristics of one or multiple spot beams. Thus, an exclusion zone may cause a satellite to change its beams when traversing over a particular geographic area.

Further, the EZ approaches discussed above may work in a variety of non-terrestrial network reference architectures, whether as part of a bent pipe approach, with a gNB on earth (amplification only, no signal processing in orbit); or whether as part of a gNB in-orbit (having regeneration with additional signal processing decode and forward, such as to other satellites in network via inter-satellite links prevalent in LEO constellations).

The control and adjustment of an exclusion zone may be modified as a result of standards (e.g., 3GPP standards), government or industry regulations, coordination or cooperation with terrestrial and non-terrestrial networks, and other collaborative efforts. Accordingly, it will be understood that many variations to the approaches discussed above may be provided in an implementing system.

Figure 6:
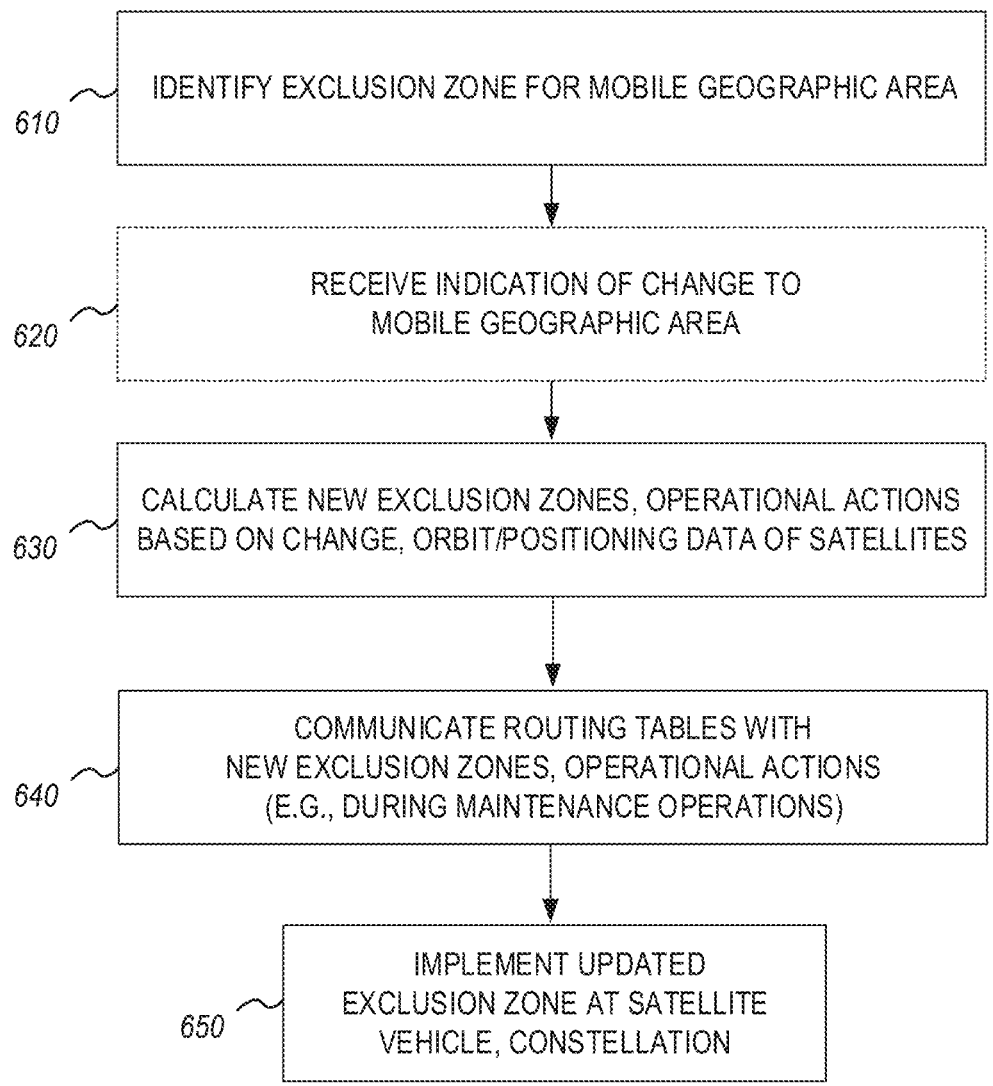
FIG. 6 illustrates a flowchart of a method of implementing exclusion zones in a non-terrestrial communication network, according to an example.

FIG. 6 illustrates a flowchart 600 of an example method of implementing SV-based exclusion zones in a non-terrestrial communication network. Here, because constellation routing is predetermined then uploaded as part of operational infrastructure "maintenance", an exclusion zone may be inserted into the routing tables that are updated later. In this manner, an exclusion zone may be deployed, removed, and managed, based on instructions from earth.

In this method, operations are sequentially performed to: identify fixed geographic areas (e.g., prohibited countries) for exclusion (operation 610); identify mobile geographic areas or entities (e.g., airplanes) for exclusion (operation 620); calculate operational actions for the SV based on geographic areas, and orbit/positioning data of satellites (operation 630); and communicate operational actions to satellites with routing table updates (operation 640). The flowchart then concludes with the implementation of the exclusion zone at the satellite vehicle(s) or constellation (operation 650). It will be understood that this method 600 will be modified in the event that the satellite includes on-board circuitry to calculate, estimate, or predict the operational actions (or characteristics of the exclusion zone).

In more detail, with operations 610 and 620 the exclusion zone may be determined based on earth coordinates (even if it is an airplane or other mobile object, the exclusion zone is calculated based on a projection to an earth location for simplicity). Then, with operation 630, the flyover orbital data and intensity is used to pre-determine which spotbeam, antenna array, or equivalent broadcasting structure may be turned on or off or reduced. For example, the adjustment may involve reducing intensity below a threshold indicated by the regulatory agency, a service provider agreement on landing rights, etc.

Operations 610-630 may involve various terrestrial (on-earth) actions to calculate and update the operational routing table to reflect the calculated exclusion zones. Then, operation 640 may involve uploading the constellation routing table, such as part of normal maintenance operations (e.g., every 48 hours, or more often with a higher number of satellite vehicles due to orbital shifts).

Figure 7:
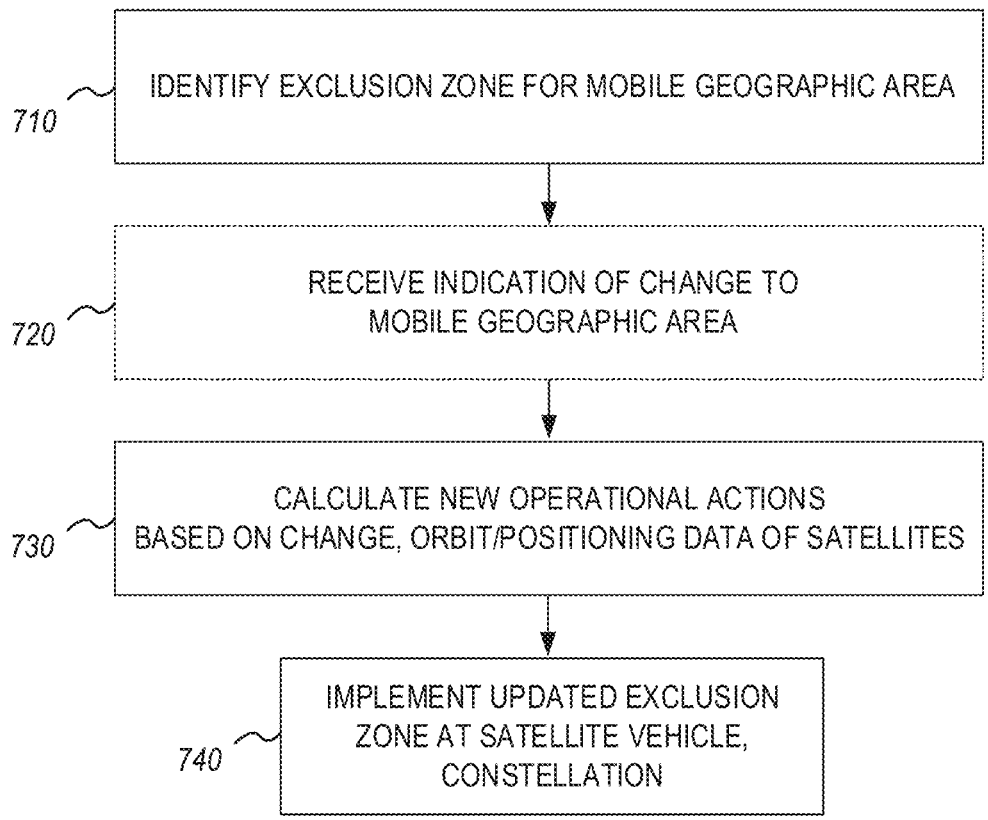
FIG. 7 illustrates a flowchart of a method of updating exclusion zone information for exclusion zones in a non-terrestrial communication network, according to an example.

FIG. 7 illustrates a flowchart 700 of an example method of updating SV-based exclusion zone information for exclusion zones in a non-terrestrial communication network, particularly in a scenario where a mobile geographic area needs to be updated (e.g., due to a flight plan change). In this method, operations are sequentially performed to: identify a exclusion zone for a mobile geographic area (operation 710); optionally receive an indication of a change to the mobile geographic area (operation 720); calculate new operational actions based on change, orbit/positioning data of satellites (operation 730); and implement an updated exclusion zone at the satellite vehicle, constellation, based on the new operational actions (operation 740). It will be understood that this method 700 also will be modified in the event that the satellite includes on-board circuitry to calculate, estimate, or predict the operational actions (or characteristics of the exclusion zone).

Additionally, the operations discussed above to calculate the exclusion zones on Earth and propagate the exclusion zone changes (via a routing table update, related to operations 630, 640) may be performed on an urgent/rush basis. In other examples, the calculation of the exclusion zones may be performed on the satellite vehicle, provided that sufficient computing resources and orbital data is available to the vehicle.

Finally, it will be understood that the techniques discussed herein may encompass computing systems, methods, software instructions, and circuitry to perform one or more of the following aspects: An exclusion zone implementable per-device/UE (e.g., based on a device identifier); An exclusion zone implementable per-spot beam; An exclusion zone implementable via UE or via spot-beam, to "turn-off/turn-on" based on information communicated within the satellite routing tables (that need to be updated frequently for LEO constellations); Control of the exclusion zone based on a projected intensity of spot-beam (e.g., low intensity "on" may be acceptable depending on country radiation threshold); Implementation of the exclusion zone using terrestrial-based RAN processing, using in-orbit RAN, or a combination of both; and Implementation of the exclusion zone with different RAN Ground Station backhaul options, including but not limited to fiber, microwave, satellite links (including links within LEO/GEO satellites).

Exclusion Zones Implemented for Inter-Satellite Communications

Inter-Satellite Links (ISLs), such as those links between SVs of a constellation, are subject to interference concerns similar to the geographic-based keep-outs (geographically, on ground) as discussed above. Such interference may occur from a higher-altitude satellite, which intends to provide data transmissions through a field of lower-altitude and orbiting LEO/MEO SVs either from the same constellation or other competing constellations. These lower-altitude, orbiting satellites (e.g., LEO SVs) may provide ISLs within a constellation or between constellations that cross the coverage area of a higher-orbit satellite (e.g., a GEO satellite) and potentially interfere with the higher-orbit satellite's communication to or from ground.

The following extends the concept of EZs to apply to ISLs, to mitigate interference with geostationary and orbital competing non-geostationary constellations, atmospheric impacts, noise, or other considerations. Further, the following comprehends standards defined with ITU-R s.1591 and WRC-97 recommendations on frequency sharing. As will be understood, ISL interference is a function of the number of transmitters in operation in the same frequency band, distribution of SVs, direction of fore/aft/right/left antenna communications (including optical links in these communications), and operational time.

The following provides an approach for implementing exclusion zones, without use of different ISL implementations (optical or radio), frequency bands (S, Ka, Ku), data rates, type of data exchanges, frequency of data transmission exchanges and availability bandwidth. Likewise, the following provides an approach that is independent of control accuracy, inter SV distance, and similar parameters that depend on constellation mission objectives.

Here, this approach is provided by use and application of EZs that selectively disable or change the intensity of ISL links, on a directional basis, during calculated times that the LEO ISL will interfere with higher-orbit satellite communication. As a general approach, the actors located above (at a higher orbit) take precedent, and the LEO ISL will turn the ISL antennas that have known or possibility of interference. The disabling or changing of individual ISLs is calculated on the ground along with calculations of LEO orbit adjustments, so relevant computation of routing and interference can also be considered on ground.

These techniques may be applicable to various types of ISLs and LEO constellations. Communications among form-flying ISLs involve various aspects of coordinating (1) Beam steering, (2) directivity, (3) and longer ranges and larger apertures (than free flying swarm constellations). These parameters may be considered whether to apply an exclusion zone for higher-orbit communications. ISL EZ interference is a function of the number to transmitters in operation in the same frequency band, distribution of SVs, fore/aft/rt/left antenna communication technologies (e.g., via optical links), and operational time.

As discussed elsewhere in this document, pre-determined LEO routing is used to maintain orbit and ISL connectivity alignment, and may be required at a frequent basis, such as each day. The following use of exclusion zones among ISLs considers routing among ground and space nodes, and uses the communication of routing information to LEOs to also provide a specification of multiple EZs at the same time (SV-to-SV (ISLs) SV-Earth (geographic)). The definition of exclusion zones with routing increases efficiency of constellation especially for form-flying constellations (e.g., similar to Iridium, Starlink, and the like).

In an example, exclusion zones can be calculated and provided with orbit and ISL connectivity alignment information. Thus, LEO SVs can be instructed to implement exclusion zones, when receiving instructions to adjust orbital position. Such instructions may include turning various links on and off, adjusting right, left, fore and aft antennas (regardless or implementation type), if a scenario is projected where an ISL is interfering with a higher-orbit satellite communication (or vice versa). Other considerations established with these exclusion zones may include routing that considers ground and space nodes, including EZs implemented at the same time (whether SV-to-SV or SV-earth exclusion zones), while increasing the efficiency of a constellation. These EZs may also consider that form-flying ISLs antennas often require (1) beam steering, (2) high directivity, and (3) longer ranges and larger apertures than free flying swarm constellations.

Figure 8A:
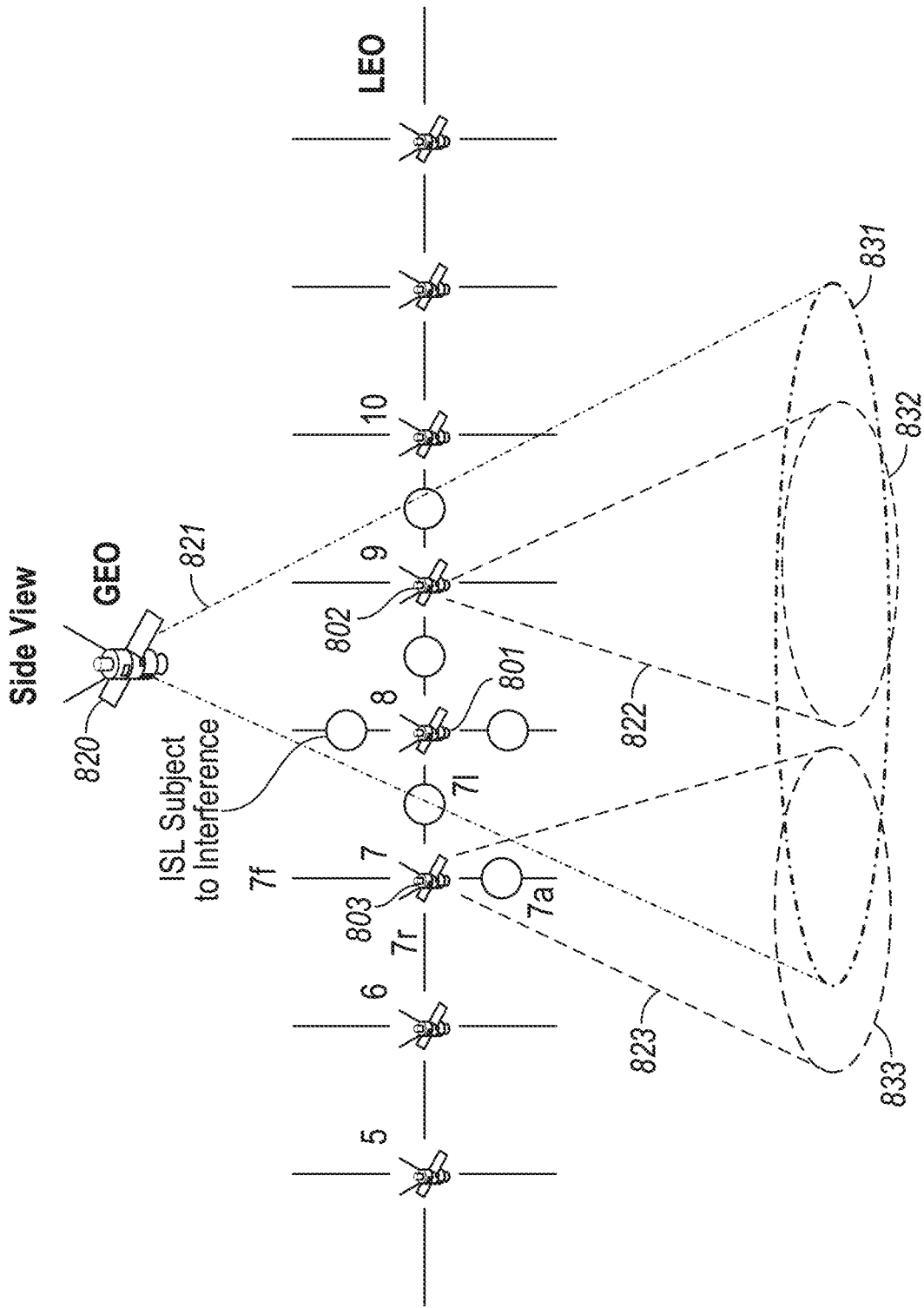
FIGS. 8A and 8B illustrate views of an example interference scenario in inter-satellite communications of a non-terrestrial communication network according to an example.
Figure 8B:
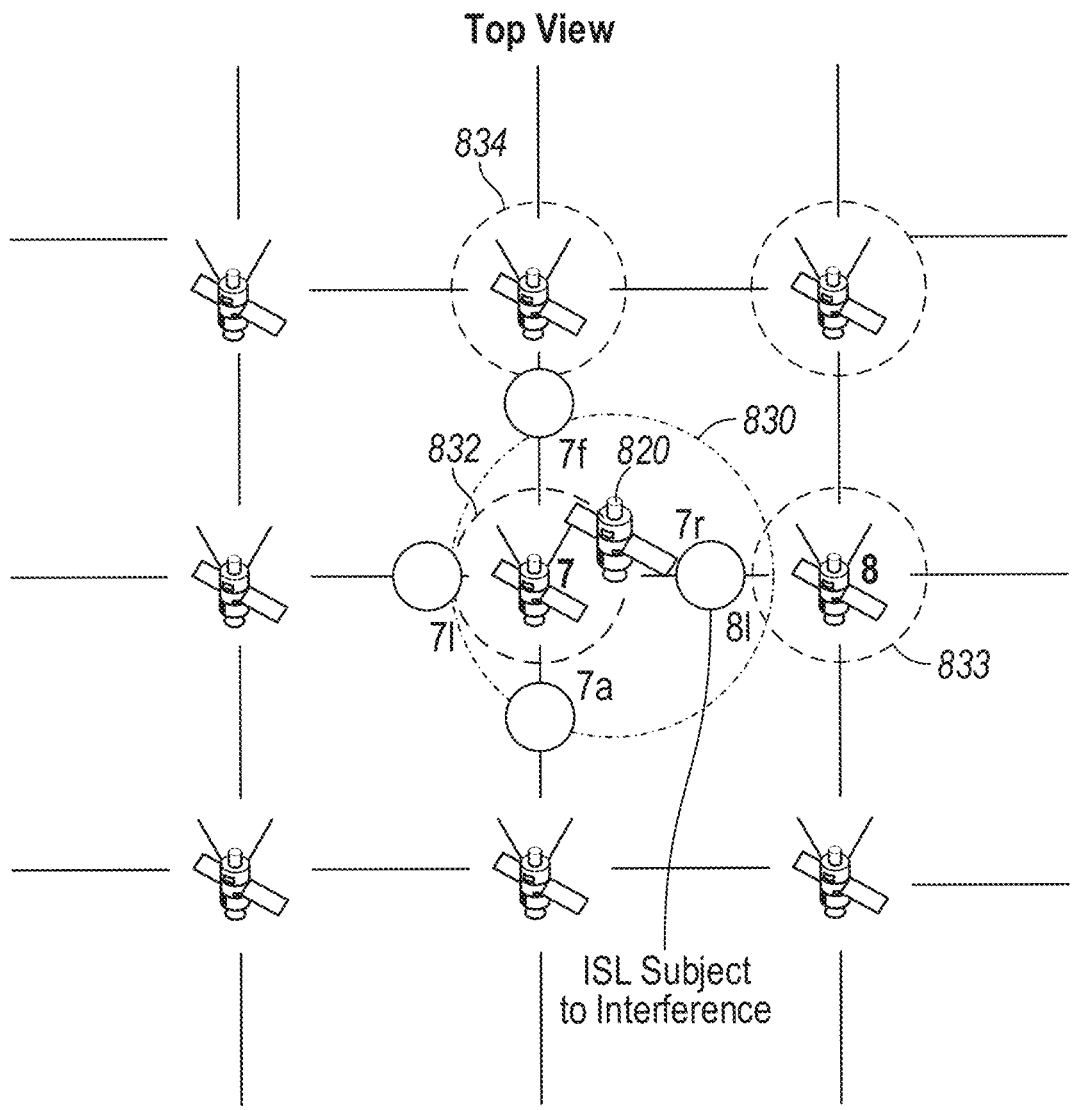

FIGS. 8A and 8B illustrate side and top views, respectively, of an example interference scenario in inter-satellite communications of a non-terrestrial communication network. As shown, a GEO satellite 820 provides a beam coverage 821 at a geographic area 831. LEO satellites 7 (803), 8 (801), and 9 (802) provide coverage that overlaps the geographic area at least in part, shown with LEO spot beam 823 from satellite 7 803, and LEO spot beam 822 from satellite 9 802.

Among LEO satellites 801, 802, 803, a number of inter-satellite connections (ISLs) exist, in right, left, fore, aft directions. This is demonstrated from a top view in FIG. 8B, where satellite 7 803 and satellite 8 801 use ISLs to communicate with each other and a number of other satellites in the constellation. In response to determining that the GEO satellite 820 will encounter interference with intersatellite links within the coverage of its beam 830 (at the LEO altitude), relevant ISLs which potentially interfere with the beam can be disabled.

A designation of beams, or specific frequency in links, to disable is shown in FIG. 8B, where all ISLs with satellite 7 802 are turned off (due to satellite 7 802 being located entirely within the coverage of area 830), in the fore, aft, left, right locations; whereas only the left communication between satellite 7 802 and satellite 8 801 is disabled.

The use of exclusion zones can be implemented in simple or complex terms, including simple methods to turn the antennas (and communication paths) off to reduce interference. This provides a method of imposing organic exclusion zones for constellation routing, and reduces wear and tear on network and network processing. In an example, a service provider can initiate an ISL interference mitigation exclusion zone, by communicating the parameters indicated in TABLE 1, above (e.g., EZ.id, EZ.name, EZ.ground, EZ.ground.radius, EZ.ground.lat, EZ.ground.long, EZ.ground.IP, EZ.ground.GPS, EZ.min.intensity). For example, such parameters may specify ID GEOsatelliten, and the characteristics of when an ISL exclusion zone should be in operation (e.g., when operating over a ground latitude and longitude at 111 degrees meridian west).

As discussed above with reference to TABLE 2, a system implementing an ISV exclusion zone may obtain future SV (fly-over) positions relative to a ground location. The response provided from Get SV Footprint, discussed above with reference to TABLE 3, may provide information to determine an expected response from fly-over telemetry (readily available via NORAD or from a constellation provider).

To prevent this interference, a calculation of the exclusion zone inquires: (1) Does SV.n.fly-over overlap/intercept with EZ.n.area ? (2) If there is overlap of the area, does SV.min.intensity>EZ.min.intensity ? (3) If Yes, then prepare to turn-off (or, lower intensity in accordance with a service provider agreement) the SV beams, links, or specific frequencies within beams or links by using the Set SV EZ command.

In an example, the Set SV EZ command is extended to include the following parameters:

TABLE 6

| Parameter | Type | Comments |
| --- | --- | --- |
| SV.EZ.fore | Int | On/off based on interference |
| SV.EZ.aft | Int | On/off based on interference |
| SV.EZ.right | Int | On/off based on interference |
| SV.EZ.left | Int | On/off based on interference |

Additional information. In an example, with no interference, SV.EZ.fore, SV.EZ.aft, SV.EZ.right, and SV.EZ.left, are set to "on". In an example, with calculated interference from other satellites, one or more of these values (e.g., SV.EZ.aft, SV.EZ.right, SV.EZ.left) are set to "off", while zero or more of the values (e.g., "SV.EZ.fore") are set to "on".

Thus, in scenarios where GEO and LEO deployments overlapping via the LEO ISLs, the capability of turning on and off a link in a particular direction may immediately remedy any possible interference. ISL EZs can also be defined to address potential interference concerns related to potential competitive LEO constellations or even for the same constellation in the different orbital planes. Thus, an exclusion zone may be defined to apply to particular frequency bands, or whatever frequency (e.g., to disable all ISLs of LEOs that fly under the GEO, or that have a potential of disruption based on other GEO, MEO, or LEOs).

In further examples, the consideration of interference or possible disruption, and the use of ISL EZs, may be based on a service provider policy. For example, a LEO provider which operates a premium service using ISLs, may disable or adapt aspects of the ISLs based on any possibility of disruption or interference (e.g., relying on ISL routing through other paths).

Accordingly, any of the examples of ISL EZs may be implemented and determined based on inter-constellation interference or disruption (e.g., within the same constellation), from other satellites or constellations (e.g., within different satellite altitudes) in the same or different orbital plane, or for policy considerations (e.g., to guarantee premium routing services do not encounter disruption). Other variation for the control, definition, and use of exclusion zones (and controls of frequency bands or types of communications within an exclusion zone) may also be provided.

Figure 9:
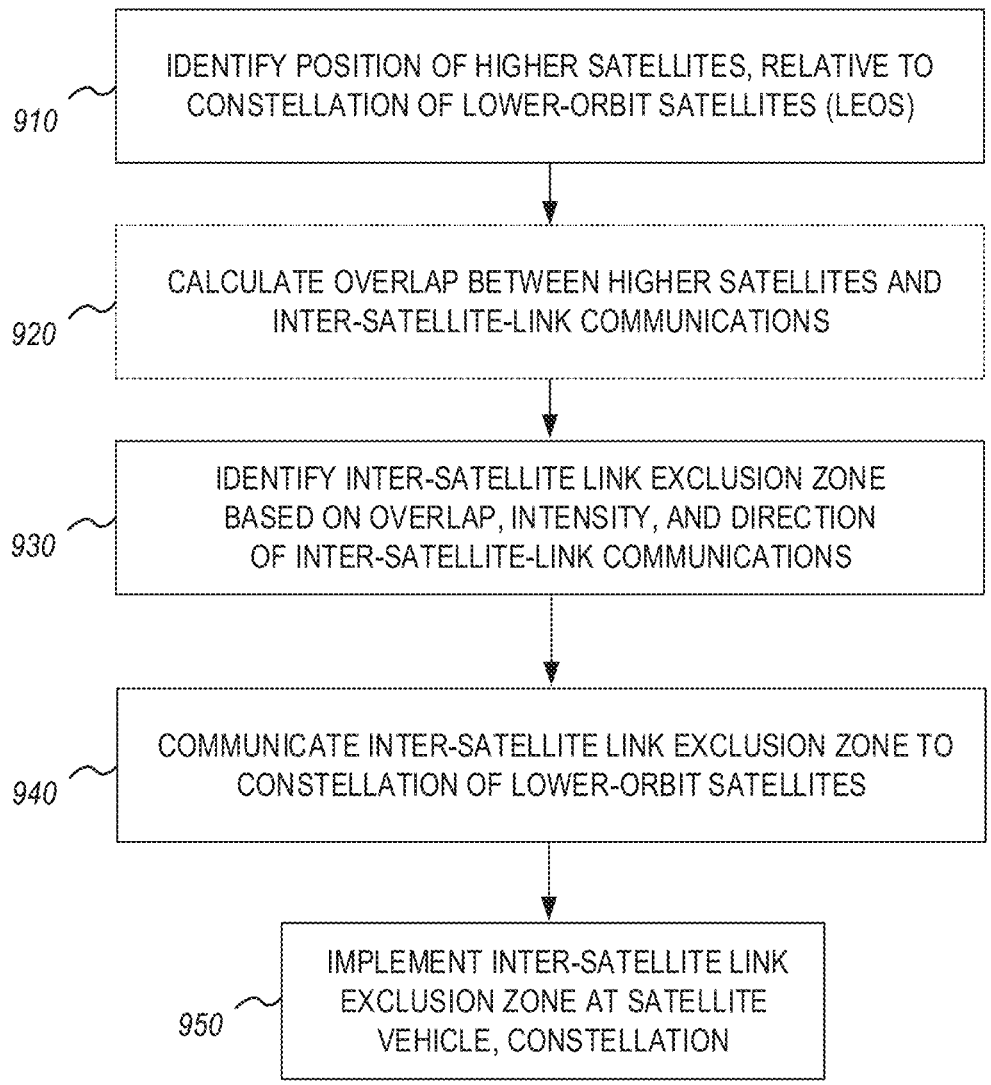
FIG. 9 illustrates a flowchart of an example method of implementing exclusion zones for inter-satellite communications in a non-terrestrial communication network according to an example.

FIG. 9 illustrates a flowchart of an example method 900 of implementing exclusion zones for inter-satellite communications in a non-terrestrial communication network according to an example.

At operation 910, the position of higher-order satellites is identified, relative to constellations of lower-orbit satellites (LEOs), and the positions that the respective LEOs of the constellations will take within orbit.

At operation 920, overlap between higher satellites and ISL communications, within such constellations, is calculated, using the positions identified in operation 910.

At operation 930, various ISL exclusion zones are identified, based on the overlap and the amount of interference. These exclusion zones may be calculated relative to the direction of the ISL, the amount of interference, the type of interference, and other characteristics. Such exclusion zones, as discussed above, may be defined with relation to aft, fore, right, or left, of individual satellites and satellite links in a constellation.

At operation 940, information or instructions to implement the ISL exclusion zones are communicated to the constellation of LEOs. This may be performed during scheduled routing and telemetry adjustments. At operation 950, the ISL exclusion zones are implemented at individual SVs and across the constellation (or constellations).

In these examples, a typical case is that all aspects of ISL exclusion zones are predetermined, because the position of constellation and ISLs within the constellation are known in advance (and communicated or adjusted, e.g., via the Telemetry and Tracking system). The ISL exclusion zone approach, in further examples, may be augmented by real time information, and the use of in real time or near-real time communications to implement an exclusion zone. For instance, if there is an emergency event, information about such event can be uploaded and used to stop interference with an ISL. (E.g., such information may be communicated from a ground station that is line-of-sight with a particular SV, or with the use of a communication network to reach the SV).

Exclusion Zones for Satellite Solar Reflections

In further examples, exclusion zones may allow operational changes at an SV to reduce fly-over flares and streaks caused by sun reflections off respective satellites. In addition to EZ implementations that reduce or restrict signal emissions, an EZ implementation may be used to reduce solar reflections off the SV through controlled use of mechanical sunshields, solar panel angle changes, and the like.

The EZ implementation principles discussed above may be extended to allow communication of information to toggle or control a mechanism such as a sunshade, on a time-controlled basis, when an SV is in an orbital position. In further examples, a calculated degree of interference (e.g., amount of solar reflection) or a reason (e.g., minimize light streaks over area with a telescope) may also be considered or communicated.

In an example, the Set SV EZ command is extended to include the following parameters:

TABLE 7

| Parameter | Type | Comments |
|---|---|---|
| SV.LRM.TOGGLE | ON/OFF | EZ Light Reflection Mitigation (LRM) ON or OFF |

Comparison of Exclusion Zone Techniques

As will be understood, standard EZ Descriptions (and Language) can be shared across Terrestrial/Non-Terrestrial Service Providers for consistency and coordination among multiple-5G Terrestrial and geostationary/non-geostationary orbit (NGO) solutions. Implementations of EZs within separate Constellation Providers may vary but EZ Descriptions for ground-based keep-out areas may be sharable across Service Providers, including Cloud and Telecommunication Service Providers. In general, standard "fixed" EZs descriptions can be used to formulate and influence routing and switching payloads to help Service Providers coordinate as the number of NGO satellites and systems increase.

The previously described Define EZ command (to define exclusion zones), Get SV command (to obtain SV orbital fly-by information), and Set EZ command (to implement an EZ within a constellation) may be extended for use with constellations, with the following definitions (with "EZn" referring to an identifier of an nth EZ):

Define EZ (Define Exclusion Zone):

TABLE 8

| Parameter | Type | Description |
|---|---|---|
| EZn.ID | INT | EZ Unique ID |
| EZn.NAME | STRING | EZ Name |
| EZn.RADIUS | FLOAT | EZ Radius for KEEP OUT AREA |
| EZn.LAT.PT | FLOAT | EZ Latitude Ground/Sky Center Point for KEEP OUT AREA |
| EZn.LONG.PT | FLOAT | EZ Longitude Ground/Sky Center Point for KEEP OUT AREA |
| EZn.IP.PT | FLOAT | EZ IP Address Ground/Sky Center Point for KEEP OUT AREA |
| EZn.GPS.PT | FLOAT | EZ GPS Ground/Sky Center Point for KEEP OUT AREA |
| EZn.MIN.INTENSITY.THRESHOLD | FLOAT | EZ Min Ground/Sky Center Point Spot Beam/Freq Intensity Threshold |
| EZn.MAX.INTENSITY.THRESHOLD | FLOAT | EZ Max Ground/Sky Center Point Spot Beam/Freq Intensity Threshold |
| EZn.ISL.TOGGLE | ON/OFF | EZ Intersatellite Link (ISL) ON or OFF |
| EZn.LRM.TOGGLE | ON/OFF | EZ Light Reflection Mitigation (LRM) ON or OFF |
| EZn.SPOT.TOGGLE | ON/OFF | EZ Spot Beam (SPOT) ON or OFF |

Get SV (Get SV Orbital "fly-by" information):

TABLE 9

| Parameter | Type | Description |
|---|---|---|
| SVn.ID.International | STRING | International Designator |
| SVn.ID.NORAD | INT | NORAD Catalog Number |
| SVn.ID.NAME | STRING | SV Name |
| SVn.GND.lat | FLOAT | Ground location latitude for SV fly-over |
| SVn.GND.long | FLOAT | Ground location longitude for SV fly-over |
| SVn.GND.alt | FLOAT | Ground location altitude % for intensity threshold calculations |
| SVn.GND.time | INT | Amount of time to obtain SV flyover(s) |
| SVn.Period | Minutes | Location Minutes |
| SVn.inclination | Degrees | Location Inclination |
| SVn.Apogee.Height | KM | Location Apogee |
| SVn.Perigee.Height | KM | Location Perigee |
| SVn.Eccentricity | FLOAT | Location Eccentricity |

Set EZ (Implement EZ within Constellation):

TABLE 10

| Parameter | Type | Description |
|---|---|---|
| SVn.ID.International | STRING | International Designator |
| SVn.ID.NORAD | INT | NORAD Catalog Number |
| SVn.ID.NAME | STRING | SV Name |
| SVn.SPOTn.TOGGLE | ON/OFF | SV Spot Beam n Downlink UTC TIME START/STOP |
| SVn.SPOTn.FREQn.TOGGLE | ON/OFF | SV Spot Beam n Frequency n Downlink UTC TIME START/STOP |
| SVn.ISL.FORE.TOGGLE | ON/OFF | SV Intersatellite Link UTC TIME START/STOP |
| SVn.ISL.AFT.TOGGLE | ON/OFF | SV Intersatellite Link UTC TIME START/STOP |
| SVn.ISL.RIGHT.TOGGLE | ON/OFF | SV Intersatellite Link UTC TIME START/STOP |
| SVn.ISL.LEFT.TOGGLE | ON/OFF | SV Intersatellite Link UTC TIME START/STOP |
| SVn.SHADE.TOGGLE | ON/OFF | SV Reflection Shade UTC TIME START/STOP |
| SV.EZ.method | INT | ON/OFF or Intensity reduction (e.g., based on service provider SLA) |

One configuration of an exclusion zone definition for multiple satellites of a constellation is depicted in a table 1110 of FIG. 11. Here, this drawing illustrates how different portions of a table or grid of data may allow definition of different values for different vehicles, on the basis of multiple exclusion zone types or characteristics. For example, a portion of this table 1110 may be used to define a toggle (disable/enable) value for a spot beam or a frequency within a spot beam, as described below with reference to FIGS. 10A and 10B and defined within the tables of FIGS. 12A and 12B. Another portion of this table 1110 may be used to define a toggle (disable/enable) value for inter-satellite links, including different communication directions for the links, as described below with reference to FIG. 10C and defined within the table of FIG. 12C. Finally, another portion of this table 1110 may be used to define a reflection mitigation control, as described below with reference to FIG. 10D and defined within the table of FIG. 12D. This data format and table format is provided only for purposes of illustration; many other data representations, definitions, and formats may be used to communicate or represent exclusion zone data.

Figure 10A:
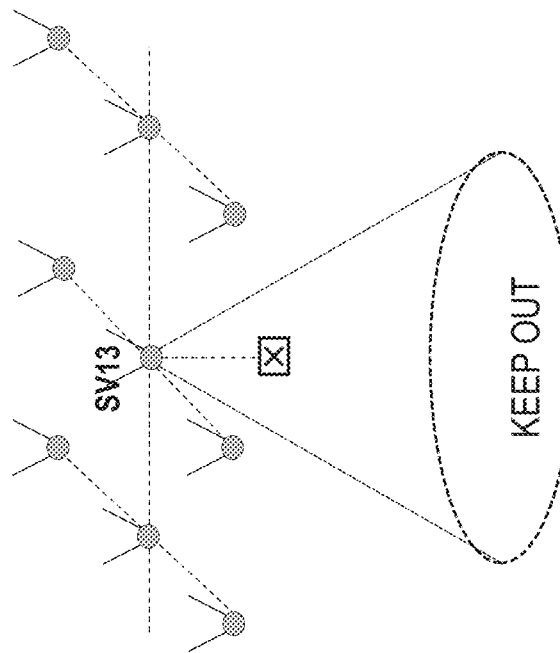

FIG. 10A illustrates further views of an example interference scenario 1010A over a geographic area, and the use of spot beam frequency exclusion zones to implement a keep-out area from SV7. Here, the intent of the EZ is to block specific signals from radiating on the ground, such as where different countries or geographical areas impose different intensity limits. For instance, to implement this exclusion zone based on frequency, values such as the following may be established via the following Define EZ (TABLE 11), Get SV (TABLE 12), and Set EZ (TABLE 13) commands:

TABLE 11

| Define EZ (Input) | |
| --- | --- |
| Parameter | Value |
| EZn.ID | EZ22.12345 |
| EZn.NAME | EZ22.AZ_GND_STATION_KO |
| EZn.RADIUS | 100 Meters |
| EZn.LAT.PT | 33.54563 |
| EZn.LONG.PT | −111.97624 |
| EZn.IP.PT | N/A (for this EZ) |
| EZn.GPS.PT | N/A (for this EZ) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 12

| Get SV (input) | |
| --- | --- |
| Parameter | Value |
| SVn.ID.International | 2019-029BD |
| SVn.ID.NORAD | 44286 |
| SVn.ID.NAME | SV7 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |

TABLE 12-continued

| Get SV (input) | |
| --- | --- |
| Parameter | Value |
| SVn.Perigee.Height | 319 |
| SVn.Eccentricity | 0.00056 |

TABLE 13

| Set EZ (Output per SV) (Disable different frequencies in respective spotbeams) | |
| --- | --- |
| Parameter | Value |
| SVn.ID.International | 2019-029BD |
| SVn.ID.NORAD | 44286 |
| SVn.ID.NAME | SV7 |
| SVn.SPOTn.TOGGLE | ON |
| SVn.SPOTn.FREQn.TOGGLE | SV7.SPOT1.FREQ2.DISABLE START 2021-03-03 21:43:56; STOP 2021-03-03 21:45:06; |
| SVn.ISL.FORE.TOGGLE | ON |
| SVn.ISL.AFT.TOGGLE | ON |
| SVn.ISL.RIGHT.TOGGLE | ON |
| SVn.ISL.LEFT.TOGGLE | ON |
| SVn.SHADE.TOGGLE | ON |
| SV.EZ.method | ON >15% |

A detailed charting of a subset of SET EZ values to disable a particular spot beam frequency is shown in table 1110A of FIG. 12A, where a value 1120A to disable a particular spot beam of a particular satellite vehicle at a particular time (and for a particular duration) is communicated.

Figure 10B:
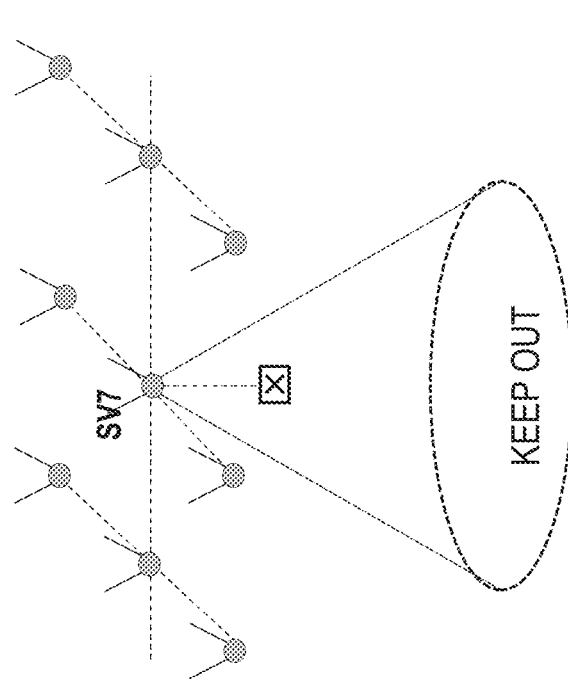

FIG. 10B illustrates further views of an example interference scenario 1010B over a geographic area, and the use of combined spot beam frequency exclusion zones to implement a keep-out area of all frequencies from a spot beam of SV13. For instance, to implement this exclusion zone for an entire spot beam, values such as the following may be established via the following Define EZ (TABLE 14), Get SV (TABLE 15), and Set EZ (TABLE 16) commands:

TABLE 14

| Define EZ (Input) | |
| --- | --- |
| Parameter | Value |
| EZn.ID | EZ22.12345 |
| EZn.NAME | EZ22.AZ_GND_STATION_KO |
| EZn.RADIUS | 100 Meters |
| EZn.LAT.PT | 33.54563 |
| EZn.LONG.PT | −111.97624 |
| EZn.IP.PT | N/A (for this EZ) |
| EZn.GPS.PT | N/A (for this EZ) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 15

| Get SV (input) | |
| --- | --- |
| Parameter | Value |
| SVn.ID.International | 2019-029BD |
| SVn.ID.NORAD | 44286 |

TABLE 15-continued

Get SV (input)

| Parameter | Value |
|---|---|
| SVn.ID.NAME | SV13 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 16

Set EZ (Output per SV)
(Disable respective spotbeams)

| Parameter | Value |
|---|---|
| SVn.ID.International | 2019-029BD |
| SVn.ID.NORAD | 44286 |
| SVn.ID.NAME | SV13 |
| SVn.SPOTn.TOGGLE | SV13.SPOT2.DISABLE START 2021-05-04 22:43:56; STOP 2021-05-04 22:46:06; |
| SVn.SPOTn.FREQn.TOGGLE | OFF |
| SVn.ISL.FORE.TOGGLE | ON |
| SVn.ISL.AFT.TOGGLE | ON |
| SVn.ISL.RIGHT.TOGGLE | ON |
| SVn.ISL.LEFT.TOGGLE | ON |
| SVn.SHADE.TOGGLE | ON |
| SV.EZ.method | OFF |

A detailed charting of a subset of SET EZ values to disable an entire spot beam is shown in table 1110B of FIG. 12B, where a value 1120B to disable a particular spot beam of a particular satellite vehicle at a particular time (and for a particular duration) is communicated.

It will be understood that other variations to the approaches of FIGS. 10A and 10B may be implemented with EZs to block transmissions onto defined areas. For instance, such exclusion zones may provide permutations of a spot beam block, a frequency block within a beam, or an "ignore" setting when the intensity of the spot beam is below the intensity of allowance in the keep out zone.

FIG. 10C illustrates further views of an example interference scenario 1010C in inter-satellite communications of a non-terrestrial communication network. Depending on orbit positions, altitude, type of interference, and other characteristics, it is possible that some directions of communications (e.g., between satellite SV21 and SV19) will be determined to interfere or experience interference, whereas communications in a different direction (e.g., between satellite SV19 and other satellites) will not interfere or experience interference with higher-altitude satellite communications.

To implement an exclusion zone for control of inter-satellite links, values such as the following may be established for an exclusion zone involving SV21 of FIG. 12C via the following Define EZ (TABLE 17), Get SV (TABLE 18), and Set EZ (TABLE 19) commands:

TABLE 17

Define EZ (Input)

| Parameter | Value |
|---|---|
| EZn.ID | EZ22.12345 |
| EZn.NAME | EZ22.AZ_GEO_KO |
| EZn.RADIUS | 2000 Meters |
| EZn.LAT.PT | 33.54563 |
| EZn.LONG.PT | −111.97624 |
| EZn.IP.PT | N/A (for this EZ) |
| EZn.GPS.PT | N/A (for this EZ) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 18

Get SV (input)

| Parameter | Value |
|---|---|
| SVn.ID.International | 2019-029BD |
| SVn.ID.NORAD | 44286 |
| SVn.ID.NAME | SV21 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 19

Set EZ (Output per SV)
(Disable impacted ISLs)

| Parameter | Value |
|---|---|
| SVn.ID.International | 2019-029BD |
| SVn.ID.NORAD | 44286 |
| SVn.ID.NAME | SV21 |
| SVn.SPOTn.TOGGLE | |
| SVn.SPOTn.FREQn.TOGGLE | ON |
| SVn.ISL.FORE.TOGGLE | SV21.ISL.FORE.DISABLE START 2021-05-04 22:43:56; STOP 2021-05-04 22:46:06; |
| SVn.ISL.AFT.TOGGLE | SV21.ISL.AFT.DISABLE START 2021-05-04 22:43:56; STOP 2021-05-04 22:46:06; |
| SVn.ISL.RIGHT.TOGGLE | SV21.ISLRIGHT.DISABLE START 2021-05-04 22:43:56; STOP 2021-05-04 22:46:06; |
| SVn.ISL.LEFT.TOGGLE | SV21.ISL.LEFT.DISABLE START 2021-05-04 22:43:56; STOP 2021-05-04 22:46:06; |
| SVn.SHADE.TOGGLE | ON |
| SV.EZ.method | OFF |

As shown in FIG. 10C, the EZ for ISLs is defined relative to the GEO coverage area. A detailed charting of SET EZ values to disable ISLs is shown in FIG. 12C, such as value 1120D for SV21 to indicate a time and direction to disable ISLs of SV21 from FIG. 10C. To implement an exclusion zone for control of inter-satellite links for SV20, SV18, SV17, SV16, to meet the scenario shown in FIG. 10C, the Get SV (TABLE 18) SVn.ID.NAME and Set EZ (TABLE 19) SVn.ID.NAME values would substitute "SV21" with the respective "SV20", "SV18", "SV17", "SV16" values, and the Set EZ (TABLE 19) SV.ISL.FORE, .AFT, .LEFT, ..RIGHT toggle values would substitute with values relevant to the respective SVs (values 1120C, 1120E, 1120F, 1120G, 1120H in FIG. 12C).

FIG. 10D illustrates further views of an example light pollution scenario 1010D based on reflections from individual SVs of a non-terrestrial communication network. To implement an exclusion zone for control of SV mechanisms to mitigate light reflections, values such as the following may be established for an exclusion zone involving SV22 of FIG. 12D via the following Define EZ (TABLE 20), Get SV (TABLE 21), and Set EZ (TABLE 22) commands:

TABLE 20

Define EZ (Input)

| Parameter | Value |
| --- | --- |
| EZn.ID | EZ22.12345 |
| EZn.NAME | EZ22.AZ_ASTRO |
| EZn.RADIUS | 50 Meters |
| EZn.LAT.PT | 33.54563 |
| EZn.LONG.PT | −111.97624 |
| EZn.IP.PT | N/A (for this EZ) |
| EZn.GPS.PT | N/A (for this EZ) |
| EZn.MIN.INTENSITY.THRESHOLD | 15% |
| EZn.MAX.INTENSITY.THRESHOLD | 85% |
| EZn.ISL.TOGGLE | ON |
| EZn.LRM.TOGGLE | ON |
| EZn.SPOT.TOGGLE | OFF |

TABLE 21

Get SV (input)

| Parameter | Value |
| --- | --- |
| SVn.ID.International | 2019-029BD |
| SVn.ID.NORAD | 44333 |
| SVn.ID.NAME | SV22 |
| SVn.GND.lat | calc from below |
| SVn.GND.long | calc from below |
| SVn.GND.alt | calc from below |
| SVn.GND.time | calc from below |
| SVn.Period | 91 |
| SVn.Inclination | 53 |
| SVn.Apogee.Height | 326 |
| SVn.Perigee.Height | 319 |
| SVn.Eccentricity | 0.00056 |

TABLE 22

Set EZ (Output per SV) (Shade SV)

| Parameter | Value |
| --- | --- |
| SVn.ID.International | 2019-029BD |
| SVn.ID.NORAD | 44333 |
| SVn.ID.NAME | SV22 |
| SVn.SPOTn.TOGGLE | |
| SVn.SPOTn.FREQn.TOGGLE | ON |
| SVn.ISL.FORE.TOGGLE | ON |
| SVn.ISL.AFT.TOGGLE | ON |
| SVn.ISL.RIGHT.TOGGLE | ON |
| SVn.ISL.LEFT.TOGGLE | ON |
| SVn.SHADE.TOGGLE | SV22.SHADE ENABLED START 2021-05-04 22:43:56; STOP 2021-05-04 22:46:06; |
| SV.EZ.method | OFF |

A detailed charting of a subset of SET EZ values to enable (toggle) a shade or light reflection feature is shown in table 1110D of FIG. 12D, where a value 1120J to enable a sunshade of a particular satellite vehicle at a particular time (and for a particular duration) is communicated.

Other permutations of the previously described EZs may include establishing borders or zones between different LEO constellations, such as to prevent LEO constellations from different service provides from talking with one another. Likewise, other permutations may involve cooperation between constellations to enable or restrict aspects of "roaming" or accessing services offered from other service providers, network companies, or countries.

Additional Calculations and Implementations of Exclusion Zones

It will be understood that calculations and processing needed to determine, identify, and propagate EZs may be provided through a variety of edge, cloud, or server computing hardware. In further examples, some of the calculations may be provided using terrestrial-based Satellite Edge Servers/Appliances, or with the use of on-board satellite silicon (e.g., which requires space-hardened processing circuitry and hardened or self-correcting RAM, ROM memory hardware to prevent bit flips and data corruption).

Further calculations and propagation of EZs may include consideration of telemetry from satellites and satellite processing units, logging of EZ values and definitions, use of attestation and authentication, and use of security mechanisms (e.g., trusted platform modules (TPMs), boot trust, trusted execution technology, etc.), to prevent hacking or interference with EZ definitions. For instance, authenticated data for an exclusion zone may be established before placing the exclusion zone definition in a payload.

Exclusion zones may also consider or implement other aspects of privacy and security, including the use of exclusion zones to prevent the use of particular sets of satellites or particular satellites. Exclusion zones may also be the product of various negotiations of different channels or spectrum for communications. For instance, a ground communications station might have a satellite communication exclusion zone defined for the station coverage area, requiring users to utilize a particular cloud service or network for processing.

In further aspects, a "partial" exclusion zone or exclusion zone sharing arrangement may also be provided, such as implemented with the use of attestation and authentication methods. For instance, attestation may be implemented to prove that a satellite or communications entity is part of a proper exclusion zone, and that the entity is what it claims to be. Such techniques may be useful with attestation from or on behalf of sovereign entities, or with the use of multiple versions or permutations of an exclusion zone.

Multiple or overlapping EZs or EZ factors may be handled in the same way that "spectrum sharing" or "network slicing" approaches have been used for other communication networks. This may also involve negotiation between providers themselves, to describe keep out zones with granularity. Negotiation may also be useful for establishing EZs relevant to non-terrestrial communications via ISLs or inter-satellite interference. For instance, consider a scenario where there is overlap between satellites, and interference may occur at the edges of some communication area. Even though a keep out exclusion zone is defined, there may be overlap and the potential for interference. Management of overlapping coverage areas may be performed via a volunteer method (e.g., by agreeing to use different channels with spectrum, avoid interfering with each other's service, but coming to an agreement on which channels to use).

A network slicing approach for satellite communications and exclusion zones may enable a different owners of different satellites in an overlapping path to co-exist. This may be performed by satellites which negotiate in real time to provide a service level agreement overlap, or implement guard bands between different users of the spectrum. For instance, before overlap occurs, keep out areas may be indicated, and an SLA agreement may be negotiated. Further, consider a scenario where resources are allocated, but communications are shut off when it reaches the barrier. This may occur when two different owners or operators of different satellites, come within a certain range of one another. An exclusion zone may be defined to create a guard band (a slice of the exclusion zone itself).

Other forms of network slicing and exclusion may be implemented to modulate or vary communication signals or signal areas. For instance, a form of network slicing may be provided so that satellite communication data will be obscured unless the data communications fully overlaps (e.g., at the center peak of transmission). The use of modulation may enable two carriers to combine where the signals can be additive, such as where only authenticated users can use the portion of the network slice and communication spectrum.

Thus, it will be understood that exclusion zone is not necessarily discrete but can have many aspects of variation, with different levels of users, different levels of authentication and security, and different functional properties. Aspects of an exclusion zone may also be coordinated with a service agreement for communications or services, which may be monetized or controlled.

Exclusion zones may also be defined to enable coordination among multiple cloud service providers. For instance, suppose a remote service gateway of a cloud service provider has an associated exclusion zone to prevent interference from competing gateways. To operate this exclusion zone, vendors may coordinate exclusion zones based on frequency, area, or type of communication (e.g., Vendor A may license high end satellite communications spectrum, whereas Vendor B licenses low end satellite communications spectrum). Here, attestation and authentication may be used to communicate and confirm what each participant actually licensed. Further, if legitimately licensed spectrum experiences interference, the exclusion zone may be invoked to identify the proper role for an entity.

In some examples, exclusion zone attestation may be performed in addition to a key exchange or authentication credential verification. Exclusion zone attestation may occur on-board the SV, such as in a case where the EZ is communicated to a constellation, and takes effect at a later time. Further, attestation may be used to verify whether an SV has legal right to deploy satellites at some orbit (e.g., to prevent a rogue organization from being able to participate or interfere). The authorization used here may involve an element that is cryptographically tied to a satellite rather than being human readable. For instance, attestation requirements and the use of a default policy of exclusion may force entities to provide that they are legitimate. Additionally, in some examples, stronger mechanisms of attestation enforcement may include blocking and excluding communications, and even use of frequency jamming from surrounding satellites (e.g., to prevent communications by non-compliant satellites).

As indicated in the examples above, a routing table may be defined to indicate a particular point in time in which a particular communication type, direction, or feature is enabled or disabled. Thus, the loading and use of exclusion zone data from a routing table may be required in order to conduct any communications. A partial exclusion zone may also be implemented using similar approaches for indicating time or type of co-existence. Although many approaches for disabling or enabling an exclusion zone are indicated above, other methods may involve the adjustment of frequency to a satellite communication, changes to spot beams, changes to intensities and frequencies within spot beams, and other adjustments. For instance, overlapping beams from multiple satellites may be used to intensify a signal in edge coverage scenarios. Given the potential for signal amplification due to overlapping beams, an exclusion zone can be calibrated to account for this effect.

The use of exclusion zones and communication of time values is provided with the expectation that all satellites are synchronized to each other. This may be provided with the use of UTC (e.g., indicating a UTC time start and stop value) for SVs which use a time synchronization service. Other approaches for use of relative time, attestation of time values, or authentication sequences for time values, may also be implemented.

In further examples, time may be used an attestable attribute for LEO/GEO communications as a component of constructing a geo-fence policy. As will be understood, EZs may provide a type of geo-fence policy, which provides restriction or modification according to geographic area. In the context of the EZs discussed herein, a geo-fence relates to time in that the coordinated position of the satellites relative to the ground location needs to be constantly maintained. Thus, time reference is essential, either in tenms of absolute time or in terms of relative time (where relative time considers the point where satellites and ground assets are in contact until the horizon when contact is lost).

Also in further examples, location may be used an attestable attribute for LEO/GEO communications, including as part of a geo-fence policy. Such attributes may be coordinated with aspects of service roaming (e.g., inter-operator roaming as different satellite constellations move in orbit and into coverage of a user's geographic location); data geolocation policies; network access and service information; and the like.

Figure 13:
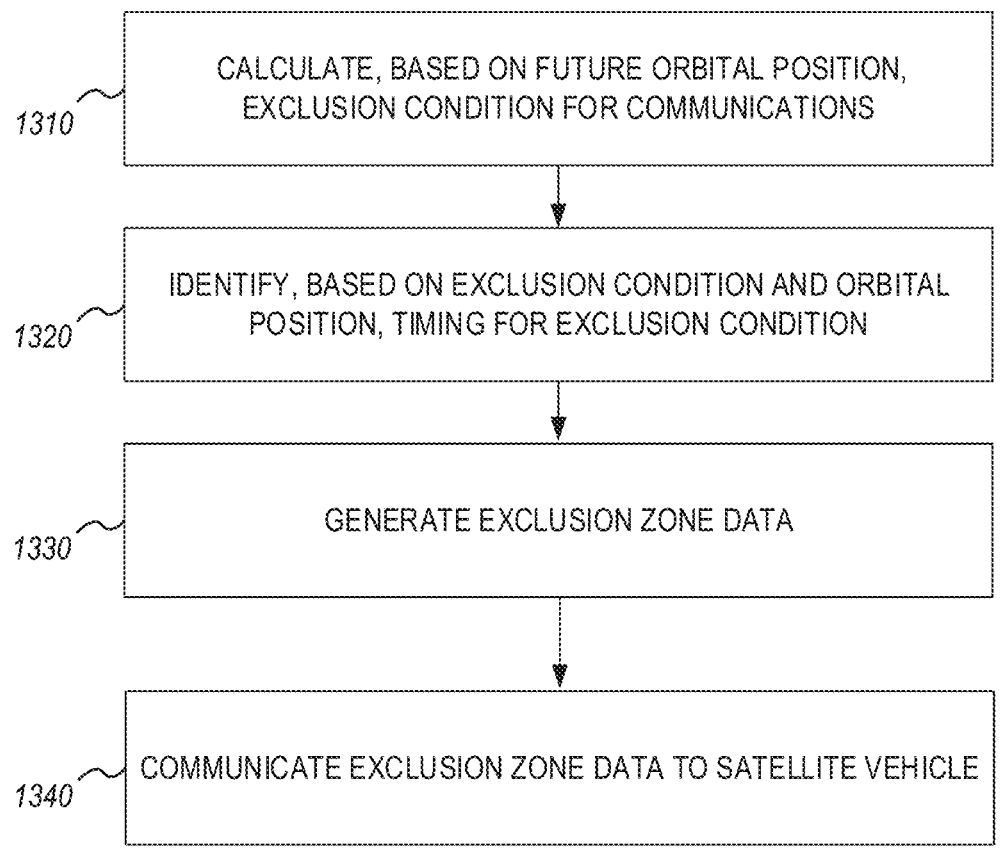
FIG. 13 illustrates a flowchart of an example method of defining and communicating exclusion zones according to an example.

FIG. 13 illustrates a flowchart of an example method 1300 of defining and communicating exclusion zones.

The method begins, at operation 1310, to calculate, based on a future orbital position of a low-earth orbit satellite vehicle, an exclusion condition for communications from the satellite vehicle.

The method continues, at operation 1320, to identify, based on the exclusion condition and the future orbital position, a timing for implementing the exclusion condition for the communications from the satellite vehicle.

The method continues, at operation 1330, to generate exclusion zone data for use by the satellite vehicle. In an example, the exclusion zone data indicates the timing for implementing the exclusion condition for the communications from the satellite vehicle.

The method completes, at operation 1340, to cause communication of the exclusion zone data to the satellite vehicle. In an example, the operations of the method 1330 are performed by a ground-based data processing server at a regular interval, and this communication occurs from the ground-based data processing server to the satellite vehicle. In further examples, the operations of the method 1300 are performed at least in part using computing hardware of the satellite vehicle.

In an example, the exclusion condition of method 1300 is an exclusion of use of a communication frequency onto a terrestrial geographic area. For instance, the exclusion zone data may further identify the communication frequency, and implementation of the exclusion zone data at the satellite vehicle causes the satellite vehicle to discontinue use of the communication frequency while in communication range over the terrestrial geographic area.

In an example, the exclusion condition of method 1300 is an exclusion of use of a spot beam onto a terrestrial geographic area, and the exclusion zone data further identifies the spot beam of the satellite vehicle, as implementation of the exclusion zone data at the satellite vehicle causes the satellite vehicle to discontinue use of the spot beam while in communication range over the terrestrial geographic area.

In an example, the exclusion condition of method 1300 is an exclusion of use of an inter-satellite link from the satellite vehicle, and the exclusion condition is based on the future orbital position overlapping with communications from another satellite vehicle. For instance, the inter-satellite link may be defined based on a fore, aft, right, or left direction from the satellite vehicle.

In an example, the exclusion condition of method 1300 is an exclusion of use of a cellular network coverage at a geographic area, and implementation of the exclusion zone data at the satellite vehicle causes the satellite vehicle to communicate a command to connected user equipment to discontinue use of a satellite network connection while the satellite vehicle is in communication range of the cellular network coverage at the geographic area.

In an example, the exclusion zone data of method 1300 is communicated to the satellite vehicle with a routing table, as the routing table operates to control the future orbital position of the satellite vehicle. In a further example, the exclusion zone data includes attestation or authentication information for verification by the satellite vehicle. Additionally, in a further example, the exclusion zone data may be designated and used by a plurality of satellite vehicles in a constellation including the satellite vehicle.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Implementation and Integration with Edge Computing Scenarios

It will be understood that the present terrestrial and non-terrestrial networking arrangements and exclusion zones may be used to provide not only connectivity but also edge computing capabilities. Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Figure 14:
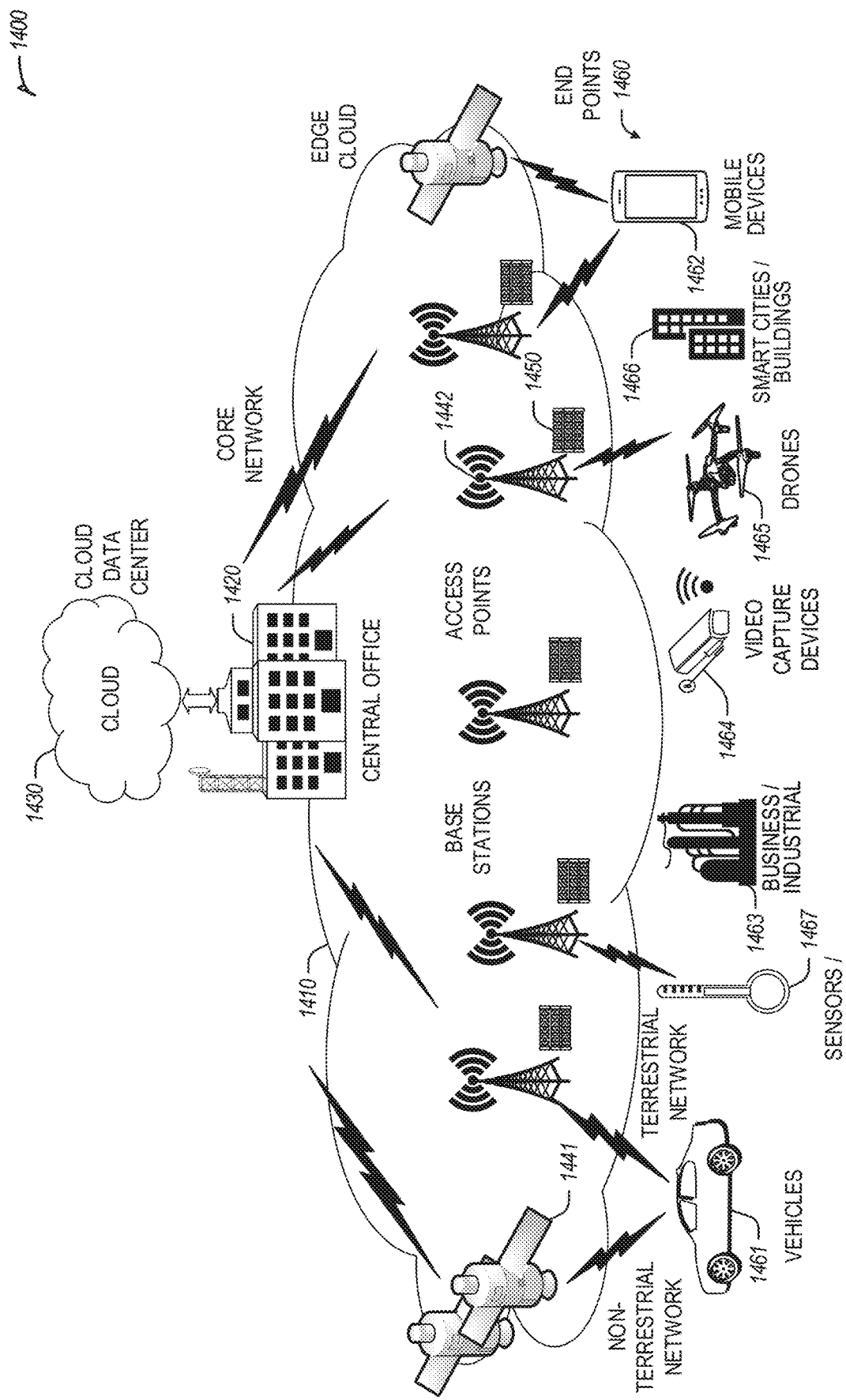
FIG. 14 illustrates an overview of an edge cloud configuration for edge computing, according to an example.

FIG. 14 is a block diagram 1400 showing an overview of a configuration for edge computing, which includes a layer of processing referenced in many of the current examples as an "edge cloud". This network topology, which may include a number of conventional networking layers (including those not shown herein), may be extended through use of the satellite and non-terrestrial network communication arrangements discussed herein.

As shown, the edge cloud 1410 is co-located at an edge location, such as a satellite vehicle 1441, a base station 1442, a local processing hub 1450, or a central office 1420, and thus may include multiple entities, devices, and equipment instances. The edge cloud 1410 is located much closer to the endpoint (consumer and producer) data sources 1460 (e.g., autonomous vehicles 1461, user equipment 1462, business and industrial equipment 1463, video capture devices 1464, drones 1465, smart cities and building devices 1466, sensors and IoT devices 1467, etc.) than the cloud data center 1430. Compute, memory, and storage resources which are offered at the edges in the edge cloud 1410 are critical to providing ultra-low or improved latency response times for services and functions used by the endpoint data sources 1460 as well as reduce network backhaul traffic from the edge cloud 1410 toward cloud data center 1430 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time. In the scenario of non-terrestrial network, distance and latency may be far to and from the satellite, but data processing may be better accomplished at edge computing hardware in the satellite vehicle rather requiring additional data connections and network backhaul to and from the cloud.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. These and other scenarios may be enhanced with the use of microservices and secure data management and sharing, as discussed in more detail below.

In contrast to the network architecture of FIG. 14, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 15:
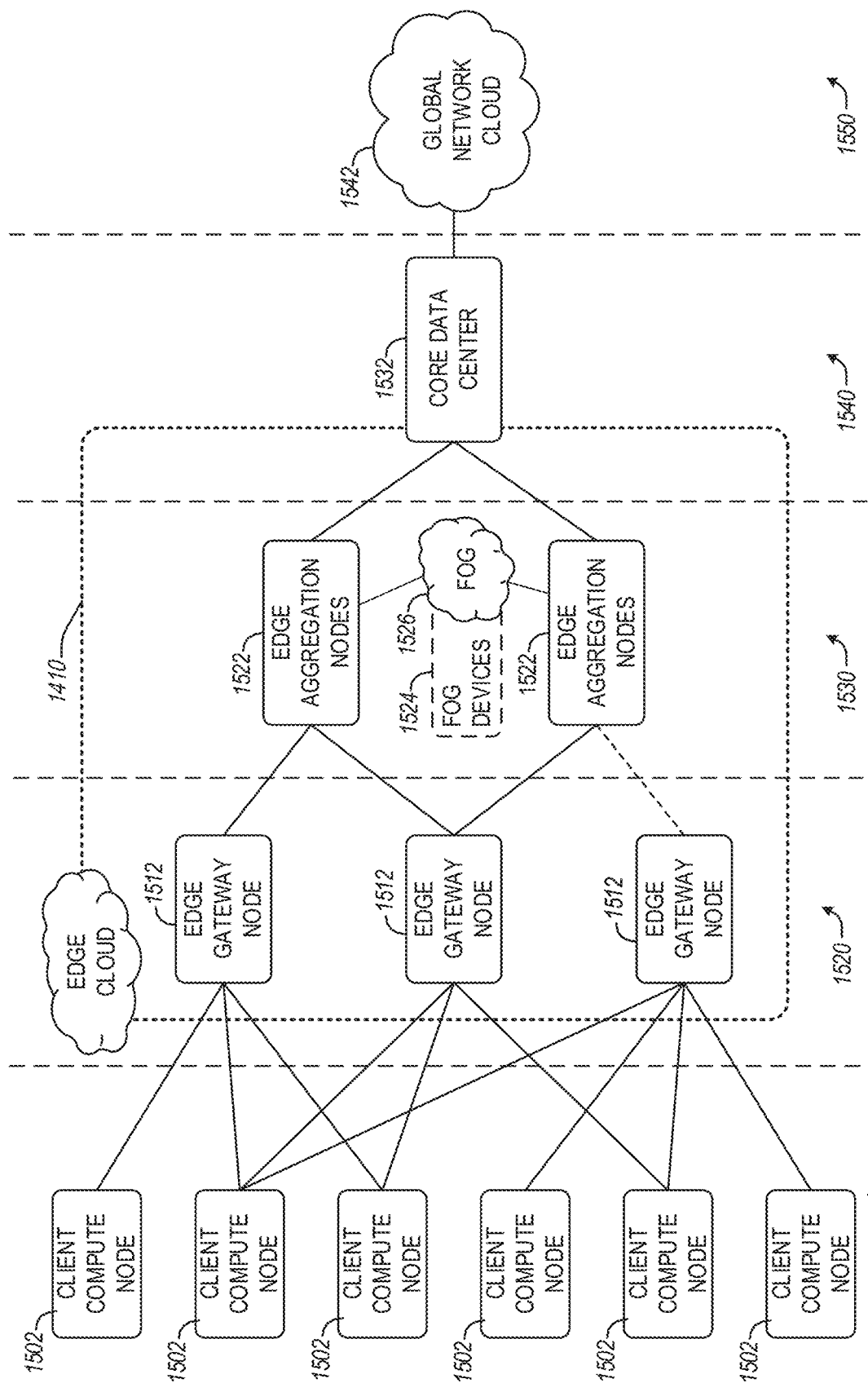
FIG. 15 illustrates an overview of layers of distributed compute deployed among an edge computing system, according to an example.

At a more generic level, an edge computing system may be described to encompass any number of deployments operating in the edge cloud 1410, which provide coordination from client and distributed computing devices. FIG. 15 provides a further abstracted overview of layers of distributed compute deployed among an edge computing environment for purposes of illustration.

FIG. 15 generically depicts an edge computing system for providing edge services and applications to multi-stakeholder entities, as distributed among one or more client compute nodes 1502, one or more edge gateway nodes 1512, one or more edge aggregation nodes 1522, one or more core data centers 1532, and a global network cloud 1542, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 1510, 1520, 1530, 1540, 1550. For example, the client compute nodes 1502 are each located at an endpoint layer 1510, while each of the edge gateway nodes 1512 are located at an edge devices layer 1520 (local level) of the edge computing system. Additionally, each of the edge aggregation nodes 1522 (and/or fog devices 1524, if arranged or operated with or among a fog networking configuration 1526) are located at a network access layer 1530 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 1532 is located at a core network layer 1540 (e.g., a regional or geographically-central level), while the global network cloud 1542 is located at a cloud data center layer 1550 (e.g., a national or global layer). The use of "core" is provided as a term for a centralized network location-deeper in the network-which is accessible by multiple edge nodes or components; however, a "core" does not necessarily designate the "center" or the deepest location of the network. Accordingly, the core data center 1532 may be located within, at, or near the edge cloud 1410.

Although an illustrative number of client compute nodes 1502, edge gateway nodes 1512, edge aggregation nodes 1522, core data centers 1532, global network clouds 1542 are shown in FIG. 15, it should be appreciated that the edge computing system may include more or fewer devices or systems at each layer. Additionally, as shown in FIG. 15, the number of components of each layer 1510, 1520, 1530, 1540, 1550 generally increases at each lower level (i.e., when moving closer to endpoints). As such, one edge gateway node 1512 may service multiple client compute nodes 1502, and one edge aggregation node 1522 may service multiple edge gateway nodes 1512.

Consistent with the examples provided herein, each client compute node 1502 may be embodied as any type of end point component, device, appliance, or "thing" capable of communicating as a producer or consumer of data. Further, the label "node" or "device" as used in the edge computing system 1500 does not necessarily mean that such node or device operates in a client or agent/minion/follower role; rather, any of the nodes or devices in the edge computing system 1500 refer to individual entities, nodes, or subsystems which include discrete or connected hardware or software configurations to facilitate or use the edge cloud 1410.

As such, the edge cloud 1410 is formed from network components and functional features operated by and within the edge gateway nodes 1512 and the edge aggregation nodes 1522 of layers 1520, 1530, respectively. The edge cloud 1410 may be embodied as any type of network that provides edge computing and/or storage resources which are proximately located to radio access network (RAN) capable endpoint devices (e.g., mobile computing devices, IoT devices, smart devices, etc.), which are shown in FIG. 15 as the client compute nodes 1502. In other words, the edge cloud 1410 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1410 may form a portion of or otherwise provide an ingress point into or across a fog networking configuration 1526 (e.g., a network of fog devices 1524, not shown in detail), which may be embodied as a system-level horizontal and distributed architecture that distributes resources and services to perform a specific function. For instance, a coordinated and distributed network of fog devices 1524 may perform computing, storage, control, or networking aspects in the context of an IoT system arrangement. Other networked, aggregated, and distributed functions may exist in the edge cloud 1410 between the cloud data center layer 1550 and the client endpoints (e.g., client compute nodes 1502). Some of these are discussed in the following sections in the context of network functions or service virtualization, including the use of virtual edges and virtual services which are orchestrated for multiple stakeholders.

The edge gateway nodes 1512 and the edge aggregation nodes 1522 cooperate to provide various edge services and security to the client compute nodes 1502. Furthermore, because each client compute node 1502 may be stationary or mobile, each edge gateway node 1512 may cooperate with other edge gateway devices to propagate presently provided edge services and security as the corresponding client compute node 1502 moves about a region. To do so, each of the edge gateway nodes 1512 and/or edge aggregation nodes 1522 may support multiple tenancy and multiple stakeholder configurations, in which services from (or hosted for) multiple service providers and multiple consumers may be supported and coordinated across a single or multiple compute devices.

In further examples, any of the compute nodes or devices discussed with reference to the present edge computing systems and environment may be fulfilled based on the components depicted in FIGS. 16A and 16B. Each edge compute node may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 16A:
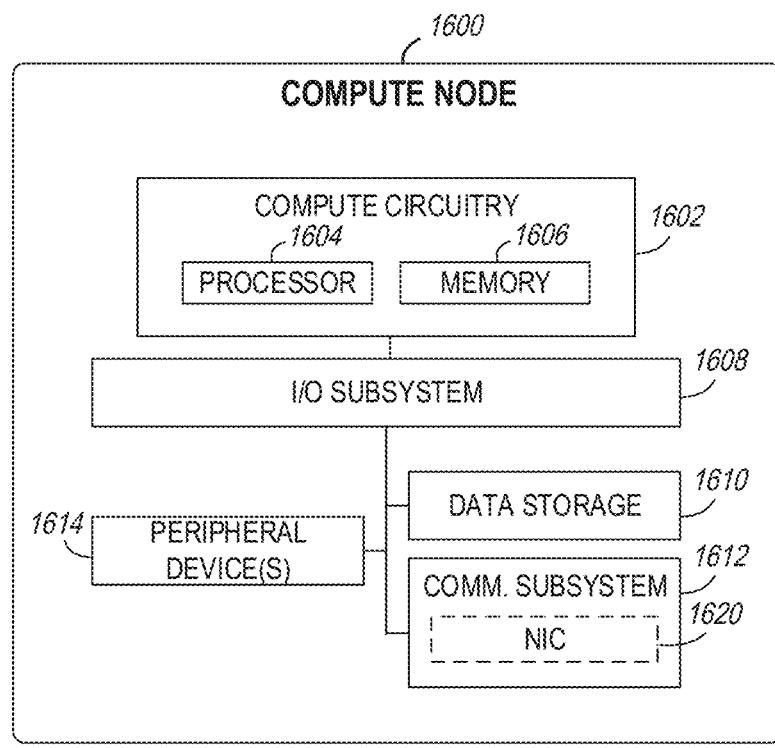
FIG. 16A illustrates an overview of example components deployed at a compute node system, according to an example.

In the simplified example depicted in FIG. 16A, an edge compute node 1600 includes a compute engine (also referred to herein as "compute circuitry") 1602, an input/output (I/O) subsystem 1608, data storage 1610, a communication circuitry subsystem 1612, and, optionally, one or more peripheral devices 1614. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 1600 may be embodied as any type of engine, device, or collection of devices capable of performing various compute functions. In some examples, the compute node 1600 may be embodied as a single device such as an integrated circuit, an embedded system, a field-programmable gate array (FPGA), a system-on-a-chip (SOC), or other integrated system or device. In the illustrative example, the compute node 1600 includes or is embodied as a processor 1604 and a memory 1606. The processor 1604 may be embodied as any type of processor capable of performing the functions described herein (e.g., executing an application). For example, the processor 1604 may be embodied as a multi-core processor(s), a microcontroller, or other processor or processing/controlling circuit. In some examples, the processor 1604 may be embodied as, include, or be coupled to an FPGA, an application specific integrated circuit (ASIC), reconfigurable hardware or hardware circuitry, or other specialized hardware to facilitate performance of the functions described herein.

The main memory 1606 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 1606 may be integrated into the processor 1604. The main memory 1606 may store various software and data used during operation such as one or more applications, data operated on by the application(s), libraries, and drivers.

The compute circuitry 1602 is communicatively coupled to other components of the compute node 1600 via the I/O subsystem 1608, which may be embodied as circuitry and/or components to facilitate input/output operations with the compute circuitry 1602 (e.g., with the processor 1604 and/or the main memory 1606) and other components of the compute circuitry 1602. For example, the I/O subsystem 1608 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1608 may form a portion of a system-on-a-chip (SoC) and be incorporated, along with one or more of the processor 1604, the main memory 1606, and other components of the compute circuitry 1602, into the compute circuitry 1602.

The one or more illustrative data storage devices 1610 may be embodied as any type of devices configured for short-term or long-term storage of data such as, for example, memory devices and circuits, memory cards, hard disk drives, solid-state drives, or other data storage devices. Each data storage device 1610 may include a system partition that stores data and firmware code for the data storage device 1610. Each data storage device 1610 may also include one or more operating system partitions that store data files and executables for operating systems depending on, for example, the type of compute node 1600.

The communication circuitry 1612 may be embodied as any communication circuit, device, or collection thereof, capable of enabling communications over a network between the compute circuitry 1602 and another compute device (e.g., an edge gateway node 1512 of the edge computing system 1500). The communication circuitry 1612 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 1612 includes a network interface controller (NIC) 1620, which may also be referred to as a host fabric interface (HFI). The NIC 1620 may be embodied as one or more add-in-boards, daughter cards, network interface cards, controller chips, chipsets, or other devices that may be used by the compute node 1600 to connect with another compute device (e.g., an edge gateway node 1512). In some examples, the NIC 1620 may be embodied as part of a system-on-a-chip (SoC) that includes one or more processors, or included on a multichip package that also contains one or more processors. In some examples, the NIC 1620 may include a local processor (not shown) and/or a local memory (not shown) that are both local to the NIC 1620. In such examples, the local processor of the NIC 1620 may be capable of performing one or more of the functions of the compute circuitry 1602 described herein. Additionally or alternatively, in such examples, the local memory of the NIC 1620 may be integrated into one or more components of the client compute node at the board level, socket level, chip level, and/or other levels.

Additionally, in some examples, each compute node 1600 may include one or more peripheral devices 1614. Such peripheral devices 1614 may include any type of peripheral device found in a compute device or server such as audio input devices, a display, other input/output devices, interface devices, and/or other peripheral devices, depending on the particular type of the compute node 1600. In further examples, the compute node 1600 may be embodied by a respective edge compute node in an edge computing system (e.g., client compute node 1502, edge gateway node 1512, edge aggregation node 1522) or like forms of appliances, computers, subsystems, circuitry, or other components.

Figure 16B:
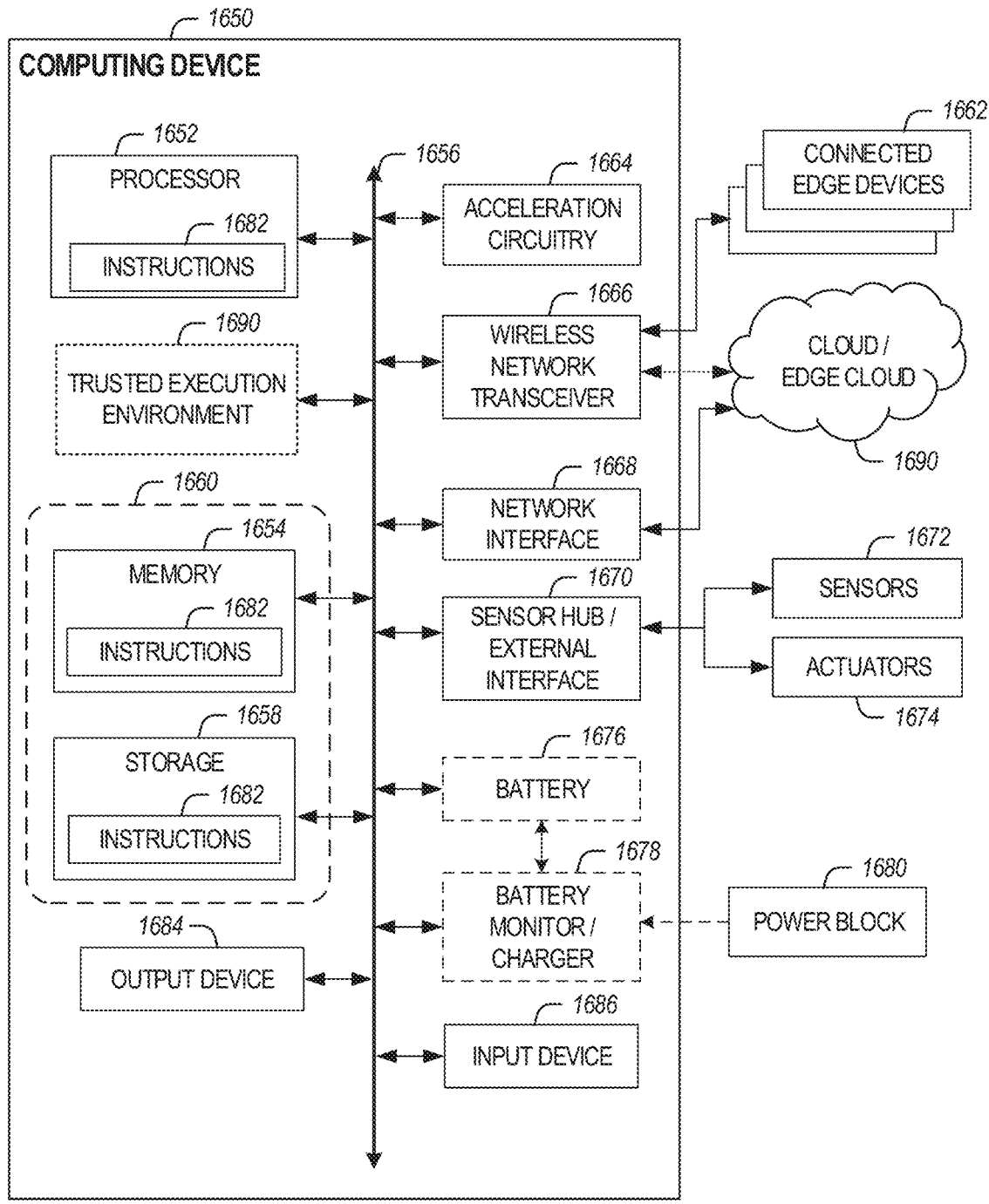
FIG. 16B illustrates a further overview of example components within a computing device, according to an example.

In a more detailed example, FIG. 16B illustrates a block diagram of an example of components that may be present in an edge computing node 1650 for implementing the techniques (e.g., operations, processes, methods, and methodologies) described herein. The edge computing node 1650 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 1650, or as components otherwise incorporated within a chassis of a larger system. Further, to support the security examples provided herein, a hardware RoT (e.g., provided according to a DICE architecture) may be implemented in each IP block of the edge computing node 1650 such that any IP Block could boot into a mode where a RoT identity could be generated that may attest its identity and its current booted firmware to another IP Block or to an external entity.

The edge computing node 1650 may include processing circuitry in the form of a processor 1652, which may be a microprocessor, a multi-core processor, a multithreaded processor, an ultra-low voltage processor, an embedded processor, or other known processing elements. The processor 1652 may be a part of a system on a chip (SoC) in which the processor 1652 and other components are formed into a single integrated circuit, or a single package, such as the Edison™ or Galileo™ SoC boards from Intel Corporation, Santa Clara, California As an example, the processor 1652 may include an Intel® Architecture Core™ based processor, such as a Quark™, an Atom™, a Xeon™, an i3, an i5, an i7, an i9, or an MCU-class processor, or another such processor available from Intel®. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc.

The processor 1652 may communicate with a system memory 1654 over an interconnect 1656 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1658 may also couple to the processor 1652 via the interconnect 1656. In an example, the storage 1658 may be implemented via a solid-state disk drive (SSDD). Other devices that may be used for the storage 1658 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1658 may be on-die memory or registers associated with the processor

1652. However, in some examples, the storage 1658 may be implemented using a micro hard disk drive (HDD). Further, any number of new technologies may be used for the storage 1658 in addition to, or instead of, the technologies described, such resistance change memories, phase change memories, holographic memories, or chemical memories, among others.

The components may communicate over the interconnect 1656. The interconnect 1656 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1656 may be a proprietary bus, for example, used in an SoC based system. Other bus systems may be included, such as an I2C interface, an SPI interface, point to point interfaces, and a power bus, among others.

The interconnect 1656 may couple the processor 1652 to a transceiver 1666, for communications with the connected edge devices 1662. The transceiver 1666 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1662. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1666 (or multiple transceivers) may communicate using multiple standards or radios for communications at a different range. For example, the edge computing node 1650 may communicate with close devices, e.g., within about 10 meters, using a local transceiver based on BLE, or another low power radio, to save power. More distant connected edge devices 1662, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 1666 (e.g., a radio transceiver) may be included to communicate with devices or services in the edge cloud 1690 via local or wide area network protocols. The wireless network transceiver 1666 may be an LPWA transceiver that follows the IEEE 802.15.4, or IEEE 8020.15.4g standards, among others. The edge computing node 1650 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1666, as described herein. For example, the transceiver 1666 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1666 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1668 may be included to provide a wired communication to nodes of the edge cloud 1690 or to other devices, such as the connected edge devices 1662 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1668 may be included to enable connecting to a second network, for example, a first NIC 1668 providing communications to the cloud over Ethernet, and a second NIC 1668 providing communications to other devices over another type of network.

Given the variety of types of applicable communications from the device to another component or network, applicable communications circuitry used by the device may include or be embodied by any one or more of components 1664, 1666, 1668, or 1670. Accordingly, in various examples, applicable means for communicating (e.g., receiving, transmitting, etc.) may be embodied by such communications circuitry.

The edge computing node 1650 may include or be coupled to acceleration circuitry 1664, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 1656 may couple the processor 1652 to a sensor hub or external interface 1670 that is used to connect additional devices or subsystems. The devices may include sensors 1672, such as accelerometers, level sensors, flow sensors, optical light sensors, camera sensors, temperature sensors, a global positioning system (GPS) sensors, pressure sensors, barometric pressure sensors, and the like. The hub or interface 1670 further may be used to connect the edge computing node 1650 to actuators 1674, such as power switches, valve actuators, an audible sound generator, a visual warning device, and the like.

In some optional examples, various input/output (I/O) devices may be present within or connected to, the edge computing node 1650. For example, a display or other output device 1684 may be included to show information, such as sensor readings or actuator position. An input device 1686, such as a touch screen or keypad may be included to accept input. An output device 1684 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 1650.

A battery 1676 may power the edge computing node 1650, although, in examples in which the edge computing node 1650 is mounted in a fixed location, it may have a power supply coupled to an electrical grid. The battery 1676 may be a lithium ion battery, or a metal-air battery, such as a zinc-air battery, an aluminum-air battery, a lithium-air battery, and the like.

A battery monitor/charger 1678 may be included in the edge computing node 1650 to track the state of charge (SoCh) of the battery 1676. The battery monitor/charger 1678 may be used to monitor other parameters of the battery 1676 to provide failure predictions, such as the state of health (SoH) and the state of function (SoF) of the battery 1676. The battery monitor/charger 1678 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1678 may communicate the information on the battery 1676 to the processor 1652 over the interconnect 1656. The battery monitor/charger 1678 may also include an analog-to-digital (ADC) converter that enables the processor 1652 to directly monitor the voltage of the battery 1676 or the current flow from the battery 1676. The battery parameters may be used to determine actions that the edge computing node 1650 may perform, such as transmission frequency, mesh network operation, sensing frequency, and the like.

A power block 1680, or other power supply coupled to a grid, may be coupled with the battery monitor/charger 1678 to charge the battery 1676. In some examples, the power block 1680 may be replaced with a wireless power receiver to obtain the power wirelessly, for example, through a loop antenna in the edge computing node 1650. A wireless battery charging circuit, such as an LTC4020 chip from Linear Technologies of Milpitas, California, among others, may be included in the battery monitor/charger 1678. The specific charging circuits may be selected based on the size of the battery 1676, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1658 may include instructions 1682 in the form of software, firmware, or hardware commands to implement the techniques described herein. Although such instructions 1682 are shown as code blocks included in the memory 1654 and the storage 1658, it may be understood that any of the code blocks may be replaced with hardwired circuits, for example, built into an application specific integrated circuit (ASIC).

In an example, the instructions 1682 provided via the memory 1654, the storage 1658, or the processor 1652 may be embodied as a non-transitory, machine-readable medium 1660 including code to direct the processor 1652 to perform electronic operations in the edge computing node 1650. The processor 1652 may access the non-transitory, machine-readable medium 1660 over the interconnect 1656. For instance, the non-transitory, machine-readable medium 1660 may be embodied by devices described for the storage 1658 or may include specific storage units such as optical disks, flash drives, or any number of other hardware devices. The non-transitory, machine-readable medium 1660 may include instructions to direct the processor 1652 to perform a specific sequence or flow of actions, for example, as described with respect to the flowchart(s) and block diagram (s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 16A and 16B are intended to depict a high-level view of components of a device, subsystem, or arrangement of an edge computing node. However, it will be understood that some of the components shown may be omitted, additional components may be present, and a different arrangement of the components shown may occur in other implementations.

EXAMPLES AND ADDITIONAL NOTES

Example 1 is a computing device, comprising: processing circuitry; and a memory device including instructions embodied thereon, wherein the instructions, which when executed by the processing circuitry, configure the processing circuitry to define a non-terrestrial communication exclusion zone with operations to: calculate, based on a future orbital position of a low-earth orbit satellite vehicle, an exclusion condition for communications from the satellite vehicle; identify, based on the exclusion condition and the future orbital position, a timing for implementing the exclusion condition for the communications from the satellite vehicle; and generate exclusion zone data for use by the satellite vehicle, the exclusion zone data indicating the timing for implementing the exclusion condition for the communications from the satellite vehicle.

In Example 2, the subject matter of Example 1 optionally includes the exclusion condition being an exclusion of use of a communication frequency onto a terrestrial geographic area, wherein the exclusion zone data further identifies the communication frequency, and wherein implementation of the exclusion zone data at the satellite vehicle causes the satellite vehicle to discontinue use of the communication frequency while in communication range over the terrestrial geographic area.

In Example 3, the subject matter of any one or more of Examples 1-2 optionally include the exclusion condition being an exclusion of use of a spot beam onto a terrestrial geographic area, wherein the exclusion zone data further identifies the spot beam of the satellite vehicle, and wherein implementation of the exclusion zone data at the satellite vehicle causes the satellite vehicle to discontinue use of the spot beam while in communication range over the terrestrial geographic area.

In Example 4, the subject matter of any one or more of Examples 1-3 optionally include the exclusion condition being an exclusion of use of an inter-satellite link from the satellite vehicle, wherein the exclusion condition is based on the future orbital position overlapping with communications from another satellite vehicle.

In Example 5, the subject matter of Example 4 optionally includes the inter-satellite link being defined based on a fore, aft, right, or left direction from the satellite vehicle.

In Example 6, the subject matter of any one or more of Examples 1-5 optionally include the exclusion zone data further including information for control of a solar reflection mitigation mechanism at the satellite vehicle, the exclusion zone data identifying the timing for implementing the solar reflection mitigation mechanism at the satellite vehicle.

In Example 7, the subject matter of any one or more of Examples 1-6 optionally include the exclusion condition being an exclusion of use of a cellular network coverage at a geographic area, wherein implementation of the exclusion zone data at the satellite vehicle causes the satellite vehicle to communicate a command to connected user equipment to discontinue use of a satellite network connection while the satellite vehicle is in communication range of the cellular network coverage at the geographic area.

In Example 8, the subject matter of any one or more of Examples 1-7 optionally include the exclusion zone data being communicated to the satellite vehicle with a routing table, the routing table to control the future orbital position of the satellite vehicle.

In Example 9, the subject matter of any one or more of Examples 1-8 optionally include the exclusion zone data including attestation or authentication information for verification by the satellite vehicle.

In Example 10, the subject matter of any one or more of Examples 1-9 optionally include the satellite vehicle being one of a plurality of satellite vehicles in a constellation, and wherein the exclusion zone data is used by the plurality of satellite vehicles in the constellation.

In Example 11, the subject matter of any one or more of Examples 1-10 optionally include an exclusion zone for the exclusion condition being defined in response to a command providing at least one of: an identifier of the exclusion zone, a name of the exclusion zone, a radius of a keep out area of the exclusion zone, a latitude and longitude of a centerpoint of a keep out area of the exclusion zone, IP address for a centerpoint of a keep out area of the exclusion zone, a GPS coordinate for a centerpoint of a keep out area of the exclusion zone, a minimum spot beam or frequency intensity threshold of the exclusion zone, a maximum spot beam or frequency intensity threshold of the exclusion zone, a intersatellite link control, a light reflection mitigation control, or a spot beam control.

In Example 12, the subject matter of Example 11 optionally includes the exclusion zone being associated within information for the exclusion zone indicating at least one of: International Designator, NORAD catalog number, satellite vehicle name, ground location latitude for fly-over of the satellite vehicle, ground location longitude for fly-over of the satellite vehicle, ground location altitude percentage for intensity threshold calculations, amount of time to obtain SV flyover(s) at a particular location.

In Example 13, the subject matter of Example 12 optionally includes the exclusion zone being associated within information for the satellite vehicle relating to at least one of: location minutes, location inclination, location relative to apogee, location relative to perigee, and location eccentricity.

In Example 14, the subject matter of any one or more of Examples 11-13 optionally include the exclusion zone being implemented within a low earth orbit satellite constellation in response to a command providing at least one of: international designator; NORAD catalog number; satellite vehicle name; satellite vehicle spot beam downlink start and stop time; satellite vehicle spot beam frequency downlink start and stop time; intersatellite link fore direction start and stop time; intersatellite link aft direction start and stop time; intersatellite link right direction start and stop time; intersatellite link left direction start and stop time; or satellite vehicle shade start and stop time.

In Example 15, the subject matter of any one or more of Examples 11-14 optionally include the exclusion zone being coordinated with one or more other exclusion zones defined for other satellite vehicles.

In Example 16, the subject matter of any one or more of Examples 1-15 optionally include the operations being performed by a ground-based data processing server at a regular interval.

In Example 17, the subject matter of Example 16 optionally includes the processing circuitry further configured to cause communication of the exclusion zone data from the ground-based data processing server to the satellite vehicle.

In Example 18, the subject matter of any one or more of Examples 1-17 optionally include the operations being performed at least in part using computing hardware of the satellite vehicle.

In Example 19, the subject matter of any one or more of Examples 1-18 optionally include the exclusion condition being defined based on compliance with interference requirements defined by one or more regulations or standards.

In Example 20, the subject matter of any one or more of Examples 1-19 optionally include the exclusion zone data including timing for implementing the exclusion condition for communications from a plurality of other satellite vehicles.

Example 21 is a method for defining a satellite communication exclusion zone, implemented with operations executed with processing circuitry of a computing device, the method comprising: calculating, based on a future orbital position of a low-earth orbit satellite vehicle, an exclusion condition for communications from the satellite vehicle; identifying, based on the exclusion condition and the future orbital position, a timing for implementing the exclusion condition for the communications from the satellite vehicle; and generating exclusion zone data for use by the satellite vehicle, the exclusion zone data indicating the timing for implementing the exclusion condition for the communications from the satellite vehicle.

In Example 22, the subject matter of Example 21 optionally includes the exclusion condition being an exclusion of use of a communication frequency onto a terrestrial geographic area, wherein the exclusion zone data further identifies the communication frequency, and wherein implementation of the exclusion zone data at the satellite vehicle causes the satellite vehicle to discontinue use of the communication frequency while in communication range over the terrestrial geographic area.

In Example 23, the subject matter of any one or more of Examples 21-22 optionally include the exclusion condition being an exclusion of use of a spot beam onto a terrestrial geographic area, wherein the exclusion zone data further identifies the spot beam of the satellite vehicle, and wherein implementation of the exclusion zone data at the satellite vehicle causes the satellite vehicle to discontinue use of the spot beam while in communication range over the terrestrial geographic area.

In Example 24, the subject matter of any one or more of Examples 21-23 optionally include the exclusion condition being an exclusion of use of an inter-satellite link from the satellite vehicle, wherein the exclusion condition is based on the future orbital position overlapping with communications from another satellite vehicle.

In Example 25, the subject matter of Example 24 optionally includes the inter-satellite link being defined based on a fore, aft, right, or left direction from the satellite vehicle.

In Example 26, the subject matter of any one or more of Examples 21-25 optionally include the exclusion zone data further including information for control of a solar reflection mitigation mechanism at the satellite vehicle, the exclusion zone data identifying the timing for implementing the solar reflection mitigation mechanism at the satellite vehicle.

In Example 27, the subject matter of any one or more of Examples 21-26 optionally include the exclusion condition being an exclusion of use of a cellular network coverage at a geographic area, wherein implementation of the exclusion zone data at the satellite vehicle causes the satellite vehicle to communicate a command to connected user equipment to discontinue use of a satellite network connection while the satellite vehicle is in communication range of the cellular network coverage at the geographic area.

In Example 28, the subject matter of any one or more of Examples 21-27 optionally include the exclusion zone data being communicated to the satellite vehicle with a routing table, the routing table to control the future orbital position of the satellite vehicle.

In Example 29, the subject matter of any one or more of Examples 21-28 optionally include the exclusion zone data including attestation or authentication information for verification by the satellite vehicle.

In Example 30, the subject matter of any one or more of Examples 21-29 optionally include the satellite vehicle being one of a plurality of satellite vehicles in a constellation, and wherein the exclusion zone data is used by the plurality of satellite vehicles in the constellation.

In Example 31, the subject matter of any one or more of Examples 21-30 optionally include an exclusion zone for the exclusion condition being defined in response to a command providing at least one of: an identifier of the exclusion zone, a name of the exclusion zone, a radius of a keep out area of the exclusion zone, a latitude and longitude of a centerpoint of a keep out area of the exclusion zone, IP address for a centerpoint of a keep out area of the exclusion zone, a GPS coordinate for a centerpoint of a keep out area of the exclusion zone, a minimum spot beam or frequency intensity threshold of the exclusion zone, a maximum spot beam or frequency intensity threshold of the exclusion zone, a intersatellite link control, a light reflection mitigation control, or a spot beam control.

In Example 32, the subject matter of Example 31 optionally includes the exclusion zone being associated within information for the exclusion zone indicating at least one of: International Designator, NORAD catalog number, satellite vehicle name, ground location latitude for fly-over of the satellite vehicle, ground location longitude for fly-over of the satellite vehicle, ground location altitude percentage for intensity threshold calculations, amount of time to obtain SV flyover(s) at a particular location.

In Example 33, the subject matter of Example 32 optionally includes the exclusion zone being associated within information for the satellite vehicle relating to at least one of: location minutes, location inclination, location relative to apogee, location relative to perigee, and location eccentricity.

In Example 34, the subject matter of any one or more of Examples 31-33 optionally include the exclusion zone being implemented within a low earth orbit satellite constellation in response to a command providing at least one of: international designator; NORAD catalog number; satellite vehicle name; satellite vehicle spot beam downlink start and stop time; satellite vehicle spot beam frequency downlink start and stop time; intersatellite link fore direction start and stop time; intersatellite link aft direction start and stop time; intersatellite link right direction start and stop time; intersatellite link left direction start and stop time; or satellite vehicle shade start and stop time.

In Example 35, the subject matter of any one or more of Examples 21-34 optionally include the exclusion zone being coordinated with one or more other exclusion zones defined for other satellite vehicles.

In Example 36, the subject matter of any one or more of Examples 21-35 optionally include the operations being performed by a ground-based data processing server at a regular interval.

In Example 37, the subject matter of Example 36 optionally includes the processing circuitry further configured to cause communication of the exclusion zone data from the ground-based data processing server to the satellite vehicle.

In Example 38, the subject matter of any one or more of Examples 21-37 optionally include the operations being performed at least in part using computing hardware of the satellite vehicle.

In Example 39, the subject matter of any one or more of Examples 21-38 optionally include the exclusion condition being defined based on compliance with interference requirements defined by one or more regulations or standards.

In Example 40, the subject matter of any one or more of Examples 21-39 optionally include the exclusion zone data including timing for implementing the exclusion condition for communications from a plurality of other satellite vehicles.

Example 41 is at least one non-transitory computer-readable storage medium including instructions, wherein the instructions, when executed by processing circuitry of a computing device, cause the processing circuitry to perform operations comprising: calculating, based on a future orbital position of a low-earth orbit satellite vehicle, an exclusion condition for communications from the satellite vehicle; identifying, based on the exclusion condition and the future orbital position, a timing for implementing the exclusion condition for the communications from the satellite vehicle; and generating exclusion zone data for use by the satellite vehicle, the exclusion zone data indicating the timing for implementing the exclusion condition for the communications from the satellite vehicle.

In Example 42, the subject matter of Example 41 optionally includes the exclusion condition being an exclusion of use of a communication frequency onto a terrestrial geographic area, wherein the exclusion zone data further identifies the communication frequency, and wherein implementation of the exclusion zone data at the satellite vehicle causes the satellite vehicle to discontinue use of the communication frequency while in communication range over the terrestrial geographic area.

In Example 43, the subject matter of any one or more of Examples 41-42 optionally include the exclusion condition being an exclusion of use of a spot beam onto a terrestrial geographic area, wherein the exclusion zone data further identifies the spot beam of the satellite vehicle, and wherein implementation of the exclusion zone data at the satellite vehicle causes the satellite vehicle to discontinue use of the spot beam while in communication range over the terrestrial geographic area.

In Example 44, the subject matter of any one or more of Examples 41-43 optionally include the exclusion condition being an exclusion of use of an inter-satellite link from the satellite vehicle, wherein the exclusion condition is based on the future orbital position overlapping with communications from another satellite vehicle.

In Example 45, the subject matter of Example 44 optionally includes the inter-satellite link being defined based on a fore, aft, right, or left direction from the satellite vehicle.

In Example 46, the subject matter of any one or more of Examples 41-45 optionally include the exclusion zone data further including information for control of a solar reflection mitigation mechanism at the satellite vehicle, the exclusion zone data identifying the timing for implementing the solar reflection mitigation mechanism at the satellite vehicle.

In Example 47, the subject matter of any one or more of Examples 41-46 optionally include the exclusion condition being an exclusion of use of a cellular network coverage at a geographic area, wherein implementation of the exclusion zone data at the satellite vehicle causes the satellite vehicle to communicate a command to connected user equipment to discontinue use of a satellite network connection while the satellite vehicle is in communication range of the cellular network coverage at the geographic area.

In Example 48, the subject matter of any one or more of Examples 41-47 optionally include the exclusion zone data being communicated to the satellite vehicle with a routing table, the routing table to control the future orbital position of the satellite vehicle.

In Example 49, the subject matter of any one or more of Examples 41-48 optionally include the exclusion zone data including attestation or authentication information for verification by the satellite vehicle.

In Example 50, the subject matter of any one or more of Examples 41-49 optionally include the satellite vehicle being one of a plurality of satellite vehicles in a constellation, and wherein the exclusion zone data is used by the plurality of satellite vehicles in the constellation.

In Example 51, the subject matter of any one or more of Examples 41-50 optionally include an exclusion zone for the exclusion condition being defined in response to a command providing at least one of: an identifier of the exclusion zone, a name of the exclusion zone, a radius of a keep out area of the exclusion zone, a latitude and longitude of a centerpoint of a keep out area of the exclusion zone, IP address for a centerpoint of a keep out area of the exclusion zone, a GPS coordinate for a centerpoint of a keep out area of the exclusion zone, a minimum spot beam or frequency intensity threshold of the exclusion zone, a maximum spot beam or frequency intensity threshold of the exclusion zone, a intersatellite link control, a light reflection mitigation control, or a spot beam control.

In Example 52, the subject matter of Example 51 optionally includes the exclusion zone being associated within information for the exclusion zone indicating at least one of: International Designator, NORAD catalog number, satellite vehicle name, ground location latitude for fly-over of the satellite vehicle, ground location longitude for fly-over of the satellite vehicle, ground location altitude percentage for intensity threshold calculations, amount of time to obtain SV flyover(s) at a particular location.

In Example 53, the subject matter of Example 52 optionally includes the exclusion zone being associated within information for the satellite vehicle relating to at least one of: location minutes, location inclination, location relative to apogee, location relative to perigee, and location eccentricity.

In Example 54, the subject matter of any one or more of Examples 51-53 optionally include the exclusion zone being implemented within a low earth orbit satellite constellation in response to a command providing at least one of: international designator; NORAD catalog number; satellite vehicle name; satellite vehicle spot beam downlink start and stop time; satellite vehicle spot beam frequency downlink start and stop time; intersatellite link fore direction start and stop time; intersatellite link aft direction start and stop time; intersatellite link right direction start and stop time; intersatellite link left direction start and stop time; or satellite vehicle shade start and stop time.

In Example 55, the subject matter of any one or more of Examples 41-54 optionally include the exclusion zone being coordinated with one or more other exclusion zones defined for other satellite vehicles.

In Example 56, the subject matter of any one or more of Examples 41-55 optionally include the operations being performed by a ground-based data processing server at a regular interval.

In Example 57, the subject matter of Example 56 optionally includes the processing circuitry further configured to cause communication of the exclusion zone data from the ground-based data processing server to the satellite vehicle.

In Example 58, the subject matter of any one or more of Examples 41-57 optionally include the operations being performed at least in part using computing hardware of the satellite vehicle.

In Example 59, the subject matter of any one or more of Examples 41-58 optionally include the exclusion condition being defined based on compliance with interference requirements defined by one or more regulations or standards.

In Example 60, the subject matter of any one or more of Examples 41-59 optionally include the exclusion zone data including timing for implementing the exclusion condition for communications from a plurality of other satellite vehicles.

Example 61 is an apparatus for deploying a satellite communication exclusion zone, comprising: means for calculating, based on a future orbital position of a low-earth orbit satellite vehicle, an exclusion condition for communications from the satellite vehicle; means for identifying, based on the exclusion condition and the future orbital position, a timing for implementing the exclusion condition for the communications from the satellite vehicle; and means for generating exclusion zone data for use by the satellite vehicle, the exclusion zone data indicating the timing for implementing the exclusion condition for the communications from the satellite vehicle.

In Example 62, the subject matter of Example 61 optionally includes the exclusion condition being an exclusion of use of a communication frequency onto a terrestrial geographic area, wherein the exclusion zone data further identifies the communication frequency, and wherein implementation of the exclusion zone data at the satellite vehicle causes the satellite vehicle to discontinue use of the communication frequency while in communication range over the terrestrial geographic area.

In Example 63, the subject matter of any one or more of Examples 61-62 optionally include the exclusion condition being an exclusion of use of a spot beam onto a terrestrial geographic area, wherein the exclusion zone data further identifies the spot beam of the satellite vehicle, and wherein implementation of the exclusion zone data at the satellite vehicle causes the satellite vehicle to discontinue use of the spot beam while in communication range over the terrestrial geographic area.

In Example 64, the subject matter of any one or more of Examples 61-63 optionally include the exclusion condition being an exclusion of use of an inter-satellite link from the satellite vehicle, wherein the exclusion condition is based on the future orbital position overlapping with communications from another satellite vehicle.

In Example 65, the subject matter of Example 64 optionally includes the inter-satellite link being defined based on a fore, aft, right, or left direction from the satellite vehicle.

In Example 66, the subject matter of any one or more of Examples 61-65 optionally include the exclusion zone data further including information for control of a solar reflection mitigation mechanism at the satellite vehicle, the exclusion zone data identifying the timing for implementing the solar reflection mitigation mechanism at the satellite vehicle.

In Example 67, the subject matter of any one or more of Examples 61-66 optionally include the exclusion condition being an exclusion of use of a cellular network coverage at a geographic area, wherein implementation of the exclusion zone data at the satellite vehicle causes the satellite vehicle to communicate a command to connected user equipment to discontinue use of a satellite network connection while the satellite vehicle is in communication range of the cellular network coverage at the geographic area.

In Example 68, the subject matter of any one or more of Examples 61-67 optionally include means for causing communication of the exclusion zone data to the satellite vehicle using a routing table, the routing table to control the future orbital position of the satellite vehicle.

In Example 69, the subject matter of any one or more of Examples 61-68 optionally include operations for deploying the satellite communication exclusion zone being performed at a regular interval, the apparatus further comprising: means for causing communication of the exclusion zone data to the satellite vehicle.

In Example 70, the subject matter of any one or more of Examples 61-69 optionally include the exclusion condition being defined based on compliance with interference requirements defined by one or more regulations or standards.

A further example implementation of the presently disclosed exclusion zones includes integration with a satellite vehicle comprising circuitry for implementing or deploying a satellite communication exclusion zone, portions of an exclusion zone, fragments of an exclusion zone, or calculating geometrical features of an exclusion zone, in accordance with Examples 1-70, or other examples discussed herein.

A further example implementation of the presently disclosed exclusion zones includes integration with a satellite constellation comprising processing nodes for implementing or deploying a satellite communication exclusion zone, in accordance with Examples 1-70, or other examples discussed herein.

A further example implementation of the presently disclosed exclusion zones includes integration with a 5G or other standardized terrestrial communication network, comprising network equipment configured for implementing or deploying a satellite communication exclusion zone, in accordance with Examples 1-70, or other examples discussed herein.

A further example implementation of the presently disclosed exclusion zones includes integration with a user equipment communications device comprising circuitry for implementing or deploying a satellite communication exclusion zone, in accordance with Examples 1-70, or other examples discussed herein.

A further example implementation of the presently disclosed exclusion zones includes integration with aspects of an edge computing system, provided via low-earth orbit satellite connectivity, including respective edge processing devices and nodes to invoke or perform the operations of Examples 1-70, or other subject matter described herein.

A further example implementation of the presently disclosed exclusion zones includes integration with a client endpoint node, operable to use low-earth orbit satellite connectivity, directly or via another wireless network, to invoke or perform the operations of Examples 1-70, or other subject matter described herein.

A further example implementation of the presently disclosed exclusion zones includes integration with an aggregation node, network hub node, gateway node, or core data processing node, performing communications via low-earth orbit satellite connectivity, and located within or coupled to an edge computing system, operable to invoke or perform the operations of Examples 1-70, or other subject matter described herein.

A further example implementation of the presently disclosed exclusion zones includes integration with access point, base station, road-side unit, street-side unit, or on-premise unit, performing communications via low-earth orbit satellite connectivity, and located within or coupled to an edge computing system, operable to invoke or perform the operations of Examples 1-70, or other subject matter described herein.

A further example implementation of the presently disclosed exclusion zones includes integration with an edge node, accessible via low-earth orbit satellite connectivity, operating as an edge provisioning node, service orchestration node, application orchestration node, or multi-tenant processing node, within or coupled to an edge computing system, operable to invoke or perform the operations of Examples 1-70, or other subject matter described herein.

A further example implementation of the presently disclosed exclusion zones includes integration with an edge node, accessible via low-earth orbit satellite connectivity, operating an edge provisioning service, application or service orchestration service, virtual machine deployment, container deployment, function deployment, and compute management, within or coupled to an edge computing system, operable to invoke or perform the operations of Examples 1-70, or other subject matter described herein.

A further example implementation of the presently disclosed exclusion zones includes integration with an edge computing system, provided via low-earth orbit satellite connectivity, including aspects of network functions, acceleration functions, acceleration hardware, storage hardware, or computation hardware resources, operable to invoke or perform the use cases discussed herein, with use of Examples 1-70, or other subject matter described herein.

A further example implementation of the presently disclosed exclusion zones includes integration with an edge computing system, provided via low-earth orbit satellite connectivity, coupled to equipment providing mobile wireless communications according to 3GPP 4G/LTE or 5G network capabilities, operable to invoke or perform the use cases discussed herein, with use of Examples 1-70, or other subject matter described herein.

A further example implementation of the presently disclosed exclusion zones includes integration with an edge computing node, operable in a layer of an edge computing network or edge computing system provided via low-earth orbit satellite connectivity, the edge computing node operable as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-70, or other subject matter described herein.

A further example implementation of the presently disclosed exclusion zones includes integration with networking hardware, acceleration hardware, storage hardware, or computation hardware, with capabilities implemented thereupon, operable in an edge computing system provided via low-earth orbit satellite connectivity, to invoke or perform the use cases discussed herein, with use of Examples 1-70, or other subject matter described herein.

A further example implementation of the presently disclosed exclusion zones includes integration with an apparatus of an edge computing system, provided via low-earth orbit satellite connectivity, comprising: one or more processors and one or more computer-readable media comprising instructions that, when executed by the one or more processors, cause the one or more processors to invoke or perform the use cases discussed herein, with use of Examples 1-70, or other subject matter described herein.

A further example implementation of the presently disclosed exclusion zones includes integration with one or more computer-readable storage media operable in an edge computing system, provided via low-earth orbit satellite connectivity, the computer-readable storage media comprising instructions to cause an electronic device of, upon execution of the instructions by one or more processors of the electronic device, to invoke or perform the use cases discussed herein, with use of Examples 1-70, or other subject matter described herein.

A further example implementation of the presently disclosed exclusion zones includes integration with an apparatus of an edge computing system, provided via low-earth orbit satellite connectivity, comprising means, logic, modules, or circuitry to invoke or perform the use cases discussed herein, with use of Examples 1-70, or other subject matter described herein.

In the examples above, many references were provided to low-earth orbit (LEO) satellites and constellations. However, it will be understood that the examples above are also relevant to many forms of middle-earth orbit satellites and constellations, geosynchronous orbit satellites and constellations, and other high altitude communication platforms such as balloons. Thus, it will be understood that the techniques discussed for LEO network settings are also applicable to many other network settings.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations that involve terrestrial network connectivity (where available) to increase network bandwidth/throughput and to support additional edge services. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. A computing device, comprising:
    processing circuitry; and
    a memory device including instructions embodied thereon, wherein the instructions, which when executed by the processing circuitry, configure the processing circuitry to define a non-terrestrial communication exclusion zone with operations to:
    calculate, based on a future orbital position of a low-earth orbit satellite vehicle, an exclusion condition for transmissions from the satellite vehicle;
    identify, based on the exclusion condition and the future orbital position, a timing for implementing the exclusion condition for the transmissions from the satellite vehicle; and
    generate exclusion zone data for use by the satellite vehicle, the exclusion zone data indicating the timing for implementing the exclusion condition for the transmissions from the satellite vehicle.

2. The computing device of claim 1, wherein the exclusion condition is an exclusion of use of a spot beam onto a terrestrial geographic area, wherein the exclusion zone data further identifies the spot beam of the satellite vehicle, and wherein implementation of the exclusion zone data at the satellite vehicle causes the satellite vehicle to discontinue use of the spot beam during application of the exclusion condition over the terrestrial geographic area.

3. The computing device of claim 1, wherein the exclusion condition is an exclusion of use of a communication frequency onto a terrestrial geographic area, wherein the exclusion zone data further identifies the communication frequency, and wherein implementation of the exclusion zone data at the satellite vehicle causes the satellite vehicle to discontinue use of the communication frequency during application of the exclusion condition over the terrestrial geographic area.

4. The computing device of claim 1, wherein the exclusion condition is an exclusion of use of an inter-satellite link from the satellite vehicle, wherein the exclusion condition is based on the future orbital position overlapping with communications from another satellite vehicle.

5. The computing device of claim 4, wherein the inter-satellite link is defined based on a fore, aft, right, or left direction from the satellite vehicle.

6. The computing device of claim 1, wherein the exclusion zone data further includes information for control of a solar reflection mitigation mechanism at the satellite vehicle, the exclusion zone data identifying the timing for implementing the solar reflection mitigation mechanism at the satellite vehicle.

7. The computing device of claim 1, wherein the exclusion condition is an exclusion of use of a cellular network coverage at a geographic area, wherein implementation of the exclusion zone data at the satellite vehicle causes the satellite vehicle to communicate a command to connected user equipment to discontinue use of a satellite network connection while the satellite vehicle is in communication range of the cellular network coverage at the geographic area.

8. The computing device of claim 1, wherein the exclusion zone data is communicated to the satellite vehicle with a routing table, the routing table to control the future orbital position of the satellite vehicle, and the routing table containing instructions to effectuate the exclusion zone.

9. The computing device of claim 1, wherein the exclusion zone data includes attestation or authentication information for verification by the satellite vehicle.

10. The computing device of claim 1, wherein the satellite vehicle is one of a plurality of satellite vehicles in a constellation, and wherein the exclusion zone data is used by the plurality of satellite vehicles in the constellation.

11. The computing device of claim 1, wherein an exclusion zone for the exclusion condition is defined in response to a command providing at least one of: an identifier of the exclusion zone, a name of the exclusion zone, a radius of a keep out area of the exclusion zone, a latitude and longitude of a centerpoint of a keep out area of the exclusion zone, IP address for a centerpoint of a keep out area of the exclusion zone, a GPS coordinate for a centerpoint of a keep out area of the exclusion zone, a minimum spot beam or frequency intensity threshold of the exclusion zone, a maximum spot beam or frequency intensity threshold of the exclusion zone, a intersatellite link control, a light reflection mitigation control, or a spot beam control.

12. The computing device of claim 11, wherein the exclusion zone is associated within information for the exclusion zone indicating at least one of: International Designator, NORAD catalog number, satellite vehicle name, ground location latitude for fly-over of the satellite vehicle, ground location longitude for fly-over of the satellite vehicle, ground location altitude percentage for intensity threshold calculations, amount of time to obtain SV flyover(s) at a particular location.

13. The computing device of claim 12, wherein the exclusion zone is associated within information for the satellite vehicle relating to at least one of: location minutes, location inclination, location relative to apogee, location relative to perigee, and location eccentricity.

14. The computing device of claim 11, wherein the exclusion zone is coordinated with one or more other exclusion zones defined for other satellite vehicles.

15. The computing device of claim 11, wherein the exclusion zone is implemented within a low earth orbit satellite constellation in response to a command providing at least one of: international designator; NORAD catalog number; satellite vehicle name; satellite vehicle spot beam downlink start and stop time; satellite vehicle spot beam frequency downlink start and stop time; intersatellite link fore direction start and stop time; intersatellite link aft direction start and stop time; intersatellite link right direction start and stop time; intersatellite link left direction start and stop time; or satellite vehicle shade start and stop time.

16. The computing device of claim 1, wherein the operations are performed by a ground-based data processing server at a regular interval, the processing circuitry further configured to cause communication of the exclusion zone data from the ground-based data processing server to the satellite vehicle.

17. The computing device of claim 1, wherein the operations are performed at least in part using computing hardware of the satellite vehicle.

18. The computing device of claim 1, wherein the exclusion condition is defined based on compliance with co-existence or interference requirements defined by one or more regulations or standards.

19. The computing device of claim 1, wherein the exclusion zone data includes timing for implementing the exclusion condition for communications from a plurality of other satellite vehicles.

20. A method for defining a satellite communication exclusion zone, implemented with operations executed with processing circuitry of a computing device, the method comprising:

calculating, based on a future orbital position of a low-earth orbit satellite vehicle, an exclusion condition for transmissions from the satellite vehicle;

identifying, based on the exclusion condition and the future orbital position, a timing for implementing the exclusion condition for the transmissions from the satellite vehicle; and generating exclusion zone data for use by the satellite vehicle, the exclusion zone data indicating the timing for implementing the exclusion condition for controlling the transmissions from the satellite vehicle.

21. The method of claim 20, wherein the exclusion condition is an exclusion of use of a spot beam onto a terrestrial geographic area, wherein the exclusion zone data identifies the spot beam of the satellite vehicle, and wherein implementation of the exclusion zone data at the satellite vehicle causes the satellite vehicle to discontinue use of the spot beam during application of the exclusion condition over the terrestrial geographic area.

22. The method of claim 20, wherein the exclusion condition is an exclusion of use of a communication frequency onto a terrestrial geographic area, wherein the exclusion zone data identifies the communication frequency, and wherein implementation of the exclusion zone data at the satellite vehicle causes the satellite vehicle to discontinue use of the communication frequency during application of the exclusion condition over the terrestrial geographic area.

23. The method of claim 20, wherein the exclusion condition is associated with a requirement of use of a spot beam onto a terrestrial geographic area, wherein the exclusion zone data further identifies the spot beam of the satellite vehicle, and wherein implementation of the exclusion zone data at the satellite vehicle causes the satellite vehicle to use the spot beam during application of the exclusion condition over the terrestrial geographic area.

24. The method of claim 20, wherein the exclusion condition is associated with use of a spot beam onto a terrestrial geographic area for co-existence with a terrestrial communication network, wherein the exclusion zone data further identifies the spot beam of the satellite vehicle, and wherein implementation of the exclusion zone data at the satellite vehicle causes the satellite vehicle to coordinate with the terrestrial communication network during application of the exclusion condition over the terrestrial geographic area.

25. At least one non-transitory computer-readable storage medium including instructions, wherein the instructions, when executed by processing circuitry of a computing device, cause the processing circuitry to perform operations comprising:

calculating, based on a future orbital position of a low-earth orbit satellite vehicle, an exclusion condition for transmissions from the satellite vehicle;

identifying, based on the exclusion condition and the future orbital position, a timing for implementing the exclusion condition for the transmissions from the satellite vehicle; and generating exclusion zone data for use by the satellite vehicle, the exclusion zone data indicating the timing for implementing the exclusion condition for the transmissions from the satellite vehicle.

26. The computer-readable storage medium of claim 25, wherein the exclusion condition is an exclusion of use of a spot beam onto a terrestrial geographic area, wherein the exclusion zone data identifies the spot beam of the satellite vehicle, and wherein implementation of the exclusion zone data at the satellite vehicle causes the satellite vehicle to discontinue use of the spot beam during application of the exclusion condition over the terrestrial geographic area.

27. The computer-readable storage medium of claim 25, wherein the exclusion condition is an exclusion of use of a communication frequency onto a terrestrial geographic area, wherein the exclusion zone data identifies the communication frequency, and wherein implementation of the exclusion zone data at the satellite vehicle causes the satellite vehicle to discontinue use of the communication frequency during application of the exclusion condition over the terrestrial geographic area.

28. The computer-readable storage medium of claim 25, wherein the exclusion condition is associated with a requirement of use of a spot beam onto a terrestrial geographic area, wherein the exclusion zone data further identifies the spot beam of the satellite vehicle, and wherein implementation of the exclusion zone data at the satellite vehicle causes the satellite vehicle to use the spot beam during application of the exclusion condition over the terrestrial geographic area.

29. The computer-readable storage medium of claim 25, wherein the exclusion condition is associated with use of a spot beam onto a terrestrial geographic area for co-existence with a terrestrial communication network, wherein the exclusion zone data further identifies the spot beam of the satellite vehicle, and wherein implementation of the exclusion zone data at the satellite vehicle causes the satellite vehicle to coordinate with the terrestrial communication network during application of the exclusion condition over the terrestrial geographic area.

* * * * *